United States Patent
Ascherl et al.

(10) Patent No.: US 12,372,959 B2
(45) Date of Patent: Jul. 29, 2025

(54) SYSTEM AND METHOD FOR AUTONOMOUS WORK MACHINE APPROVAL

(71) Applicant: Deere & Company, Moline, IL (US)

(72) Inventors: Margaux M. Ascherl, Adel, IA (US); Jeffrey E. Runde, Cedar Falls, IA (US); Curtis A. Maeder, Johnston, IA (US); David A. Johnson, Durham, NC (US); Erich Wassilak, Des Moines, IA (US); Mario L. Donini, Bettendorf, IA (US)

(73) Assignee: Deere & Company, Moline, IL (US)

( * ) Notice: Subject to any disclaimer, the term of this patent is extended or adjusted under 35 U.S.C. 154(b) by 274 days.

(21) Appl. No.: 17/691,475

(22) Filed: Mar. 10, 2022

(65) Prior Publication Data

US 2022/0299991 A1 Sep. 22, 2022

Related U.S. Application Data

(60) Provisional application No. 63/164,196, filed on Mar. 22, 2021.

(51) Int. Cl.
*G05D 1/00* (2024.01)
(52) U.S. Cl.
CPC ......... *G05D 1/0016* (2013.01); *G05D 1/0022* (2013.01); *G05D 1/0219* (2013.01)
(58) Field of Classification Search
CPC .. G05D 1/0219; G05D 1/0038; A01D 34/008; A01D 41/127; A01D 41/06; G08C 2201/93; E02F 9/205
See application file for complete search history.

(56) References Cited

U.S. PATENT DOCUMENTS

2014/0028440 A1* 1/2014 Takeuchi ................ E05F 15/77
340/5.61
2017/0079195 A1* 3/2017 Yokoyama ........... G05D 1/0291
(Continued)

FOREIGN PATENT DOCUMENTS

WO    WO 2019225196 A1    11/2019

OTHER PUBLICATIONS

"Tesla Model 3—How to: Flash the lights and Honk the Horn with the App" to Cragun, published Mar. 9, 2018, time mark 0:00-0:32 available at https://www.youtube.com/watch?v=JUb3kli3e0E (Cragun) (Year: 2018).*

(Continued)

*Primary Examiner* — Kenneth J Malkowski
(74) *Attorney, Agent, or Firm* — Christopher R. Christenson; Kelly, Holt & Christenson PLLC

(57) ABSTRACT

A mobile device includes a processor and memory, coupled to the processor, which memory contains instructions that when executed cause the processor to provide an autonomy management application. The autonomy management application includes an autonomy approval function. The autonomy approval function provides a user interface configured to display at least one aspect of an autonomy job to a user and receive user acceptance of the autonomy job. The autonomy approval function is configured to instruct the user to move within a pre-determined distance from an autonomous work machine that will execute the autonomy job and provide a machine-verified indication of user proximity within the pre-determined distance. The autonomy approval function includes a begin mission user interface element displayable after verification that a user has moved within the pre-determined distance of the autonomous work machine, which begin mission user interface element, when (Continued)

selected, causes the autonomy approval function to initiate motion. A computer-implemented method is also provided.

18 Claims, 23 Drawing Sheets

(56) References Cited

U.S. PATENT DOCUMENTS

| | | | |
|---|---|---|---|
| 2017/0220039 A1 | 8/2017 | Funakawa | |
| 2017/0248946 A1* | 8/2017 | Ogura | G01S 19/14 |
| 2017/0357400 A1* | 12/2017 | Foster | G06F 3/0488 |
| 2018/0297611 A1* | 10/2018 | Fujisawa | B60W 30/18163 |
| 2020/0159220 A1 | 5/2020 | Hurd et al. | |
| 2021/0362718 A1* | 11/2021 | Ikenori | B60W 30/18109 |
| 2022/0161783 A1* | 5/2022 | Golgiri | G06V 20/588 |

OTHER PUBLICATIONS

Extended European Search Report and Written Opinion issued in European Patent Application No. 22162835.7, dated Aug. 22, 2022, in 08 pages.

* cited by examiner

SYSTEM AND METHOD FOR AUTONOMOUS WORK MACHINE APPROVAL

CROSS-REFERENCE TO RELATED APPLICATION

The present application is based on and claims the benefit of U.S. provisional patent application Ser. No. 63/164,196, filed Mar. 22, 2021, the content of which is hereby incorporated by reference in its entirety.

FIELD OF THE DESCRIPTION

This description generally relates to autonomous work machines. More specifically, but not by limitation, the present description relates to a system and method for providing approval for autonomous operations to begin in an autonomous work machine.

BACKGROUND

Unmanned Ground Vehicles (UGVs) are mobile machines that can move and perform work without having a human operator onboard. Some UGVs may operate autonomously thereby following a path and performing work in accordance with one or more job parameters.

Unmanned Ground Vehicles offer many advantages over manned systems for a variety of industries. First, they may operate more safely and precisely. Second, their sensing abilities are not limited to human senses. Third, they are not subject to human limitations, such as needing to sleep or eat, fatigue, human error, et cetera.

As UGVs begin to find use in such industries as agriculture, forestry, and construction, it is important that they interact with operators and the environment around them in a manner that is safe and efficient. Unlike hobby drones or residential lawn mowers, these massive machines have the ability to cause significant loss or damage if their activities are misplaced or performed erroneously. Further, industry adoption of such UGVs requires enough trust in the platform and system to incur the expense of equipment acquisition and then further trust to operate the UGVs on their jobs. Finally, given the significant increase in complexity over manned systems, it is important for UGVs to provide interfaces and workflows that are easy and intuitive for operators.

Precision agriculture and smart farming offer potential solutions to meet the rising food needs of an ever-expanding human population. One aspect of smart farming uses unmanned ground vehicles to perform field operations. Such UGVs can or will soon perform tasks related to fertilizing before seeding, seeding, spraying crops, and harvesting.

The discussion above is merely provided for general background information and is not intended to be used as an aid in determining the scope of the claimed subject matter.

SUMMARY

A mobile device includes a processor and memory, coupled to the processor, which memory contains instructions that when executed cause the processor to provide an autonomy management application. The autonomy management application includes an autonomy approval function. The autonomy approval function provides a user interface configured to display at least one aspect of an autonomy job to a user and receive user acceptance of the autonomy job. The autonomy approval function is configured to instruct the user to move within a pre-determined distance from an autonomous work machine that will execute the autonomy job and provide a machine-verified indication of user proximity within the pre-determined distance. The autonomy approval function includes a begin mission user interface element displayable after verification that a user has moved within the pre-determined distance of the autonomous work machine, which begin mission user interface element, when selected, causes the autonomy approval function to initiate motion. A computer-implemented method is also provided.

Example 1 is a mobile device that includes a processor and memory, coupled to the processor, which memory contains instructions that when executed cause the processor to provide an autonomy management application. The autonomy management application includes an autonomy approval function. The autonomy approval function providing a user interface configured to display at least one aspect of an autonomy job to a user and receive user acceptance of the autonomy job. The autonomy approval function is configured to instruct the user to move about a perimeter of an autonomous work machine that will execute the autonomy job and provide a machine-verified indication of user movement. The autonomy approval function includes a begin mission user interface element displayable after verification that a user has moved about the perimeter of the autonomous work machine, which begin mission user interface element, when selected, causes the autonomy approval function to initiate motion.

Example 2 is the mobile device of any or all previous examples wherein the mobile device is a smartphone.

Example 3 is the mobile device of any or all previous examples wherein the mobile device is a tablet computer.

Example 4 is the mobile device of any or all previous examples wherein user proximity within the pre-determined distance is detected using electromagnetic radiation.

Example 5 is the mobile device of any or all previous examples wherein the autonomy approval function provides a display indicative of at least one system check performed by the autonomous work machine.

Example 6 is the mobile device of any or all previous examples wherein the display provides an indication of a perception system check.

Example 7 is the mobile device of any or all previous examples wherein the display provides an indication of a positioning system check.

Example 8 is the mobile device of any or all previous examples wherein the display provides an indication of a tractor subsystem check.

Example 9 is the mobile device of any or all previous examples wherein the display provides an indication of an implement subsystem check.

Example 10 is the mobile device of any or all previous examples wherein the display provides a countdown timer indicating time until the autonomous work machine will begin motion.

Example 11 is the mobile device of any or all previous examples wherein the display provides an indication that motion is initiating.

Example 12 is the mobile device of any or all previous examples wherein the autonomy approval function provides a halt user interface element that, when actuated, halts motion of the autonomous work machine.

Example 13 is the mobile device of any or all previous examples wherein the autonomy management application provides a user interface element that, when selected, allows the user to edit the autonomy job.

Example 14 is the mobile device of any or all previous examples wherein the begin mission user interface element requires the user to slide the user interface element.

Example 15 is a computer-implemented method of providing autonomy approval for an autonomous work machine. The method includes receiving user approval of an autonomy job for an autonomous work machine and instructing the user to ensure that the user is within a pre-determined distance from the autonomous work machine. The method includes detecting user proximity within the pre-determined distance from the autonomous work machine. The method also includes providing a begin mission user interface element based on detecting user proximity within the pre-determined distance. Upon actuation of the begin mission user interface element, engaging motion of the autonomous work machine.

Example 16 is the computer-implemented method of any or all previous examples wherein detecting user proximity includes detecting electromagnetic radiation relative to at least one of the user and the autonomous work machine.

Example 17 is the computer-implemented method of any or all previous examples wherein the begin mission user interface element is provided on a mobile device.

Example 18 is the computer-implemented method of any or all previous examples and further comprising executing at least one internal system check on the autonomous work machine before providing the begin mission user interface element.

Example 19 is the computer-implemented method of any or all previous examples and further comprising generating an alert that motion startup is occurring.

Example 20 is the computer-implemented method of any or all previous examples and further comprising providing a user interface element that, when actuated, causes the autonomous work machine to halt motion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
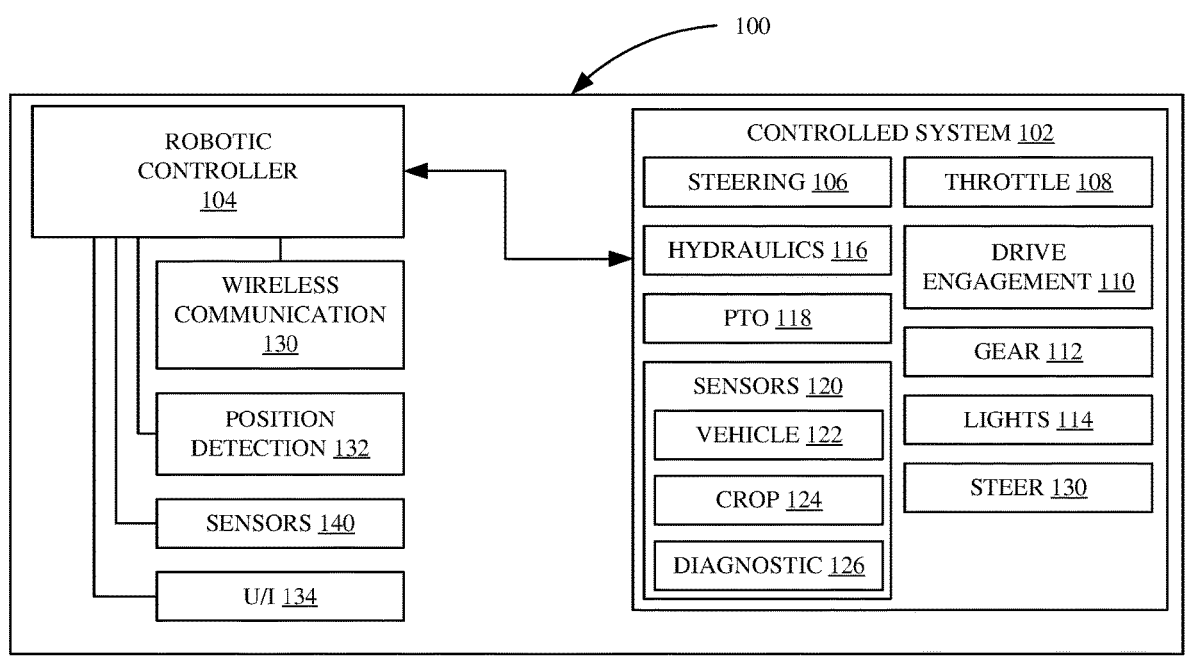
FIG. 1 is a block diagram of a control system of an UGV with which embodiments described herein are particularly useful.

FIG. 1 is a block diagram of a control system of an UGV with which embodiments described herein are particularly useful. Control system 100 includes controlled vehicle system 102 coupled to or including robotic controller 104. Robotic controller 104 receives or generates one or more ground operations for the unmanned ground vehicle and provides control signals to controlled system 102 to operate the vehicle.

Controlled system 102 includes a number of subsystems that operate various functions of the vehicle. Steering subsystem 106 provides directional control for the vehicle. In examples where there is no provision for a human driver, the steering subsystem 106 may directly control hydraulic or mechanical elements to cause movement elements (e.g. wheels or tracks) to follow a particular course. In another example, when the ground vehicle is equipped with provision for a human operator, steering subsystem 106 may include the human operable steering mechanism as well as electromechanical system for engaging the human operably steering system.

Controlled system 102 also includes throttle subsystem 108 for controlling the speed or power of the prime mover of the system. In examples where the vehicle uses an internal combustion engine, throttle subsystem 108 may control the amount of air provided to the internal combustion engine. In examples where the vehicle uses an electric drive, throttle subsystem may provide a control signal that specifies an amount of power to be applied to the electric drive motor(s).

Controlled system 102 also includes drive engagement system 110. Drive engagement system 110 selectively couples the prime mover to the movement elements. As such, drive engagement system 110 may include a clutch and/or hydraulic circuit. Transmission control subsystem 112 is also provided and selects different dears or drive ranges. In examples where UGV is a semi-tractor, transmission control subsystem 112 may select among up to 18 gears.

Controlled system 102 may also include a light subsystem 114 that may provide lights for illumination and/or annunciation. Such lights may include front illumination lights, rear illumination lights as well as side illumination lights. The illumination lights may provide illumination in the visible spectrum and/or in a spectrum that is detectable by sensors 140 coupled to robotic controller 104.

Controlled system 102 also may include hydraulics system 116 that has a hydraulic pump operably coupled to the prime mover as well as one or more hydraulic valves that control hydraulic fluid flow to one or more actuators of the vehicle. Hydraulics system 116 may be used to lift or position objects, such as a bucket or work implement.

Controlled system 112 may also include or be coupled to power take-off (PTO) subsystem 118. PTO subsystem 118 controls engagement between the prime mover and a PTO output shaft or coupling, which is used by towed implements for power.

Controlled system 112 also includes a number of sensors 120 germane to the operation of the controlled system. Where controlled system 112 includes an internal combustion engine, sensors 120 may include an oil pressure sensor, an oil temperature sensor, an RPM sensor, a coolant temperature sensor, one or more exhaust oxygen sensors, a turbine speed sensor, et cetera. In examples where the controlled system includes a hydraulic system, sensors 120 can include a hydraulic pressure sensor. In examples where the controlled system is an agricultural harvester, sensors 120 can include such sensors as a moisture sensor, mass flow sensor, protein content sensor, et cetera.

Controlled system 112 may include one or more additional subsystems as indicated at reference numeral 130.

Robotic controller 104 is coupled to controlled system 102 as indicated at reference numeral 129. This connection may include one or more system busses out connections such that robotic controller can issue command signals to the various subsystems of controlled system 102. Robotic controller 104 may include one or more processors or logic modules that enable robotic controller 104 to execute a sequence of instructions stored within memory (either within robotic controller 104 or coupled thereto) to enable robotic controller 104 to perform automatic or semi-automatic control functions. In one embodiment, robotic controller 104 is a microprocessor.

Robotic controller 104 is coupled to wireless communication module 130 to allow control system 100 to communicate wirelessly within one or more remote devices. Wireless communication can take various forms, as desired. Examples of suitable wireless communication include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GPRS/GSM/CDMA/5G NR); WiMAX (IEEE 802.16), and/or satellite communication.

Robotic controller 104 is also coupled to position detection system 132, which allows robotic controller 132 to determine the geographical location of control system 100. In one example, position detection system 132 includes a GPS receiver that is configured to receive information from GNSS satellites and calculate the device's geographical position.

Robotic controller 104 is also coupled to one or more sensors 140 that provide respective signals that allow robotic controller to move the machine to perform a given task. Examples of sensors 140 include camera systems that view the area around the machine. These cameras may operate in the visible spectrum and/or above and/or below it. Sensors 140 may also include one or more LIDAR sensors that provide a direct indication of distance from the machine to an object in the environment. Sensors 140 can also include other types of sensors that provide information indicative of a distance to objects around the machine, such as RADAR and/or ultrasonic sensors. Certainly, combinations of the various sensors set forth above can also be used. Sensors 140 may also include audio sensors such that robotic controller can detect sounds (such as nominal operation of the machine, abnormal conditions, and/or human voice).

Robotic controller is also coupled to user interface module 134, which may be coupled to one or more displays in a cab of the machine as well as one or more user input mechanisms, such as buttons, pedals, joysticks, knobs, et cetera. Additionally, or alternatively, user interface module 134 may be configured to generate a user interface on a remote user device, such as a laptop computer, smartphone, or tablet. In such instance, user interface module 134 may provide user interface information in any suitable format including HTML.

In accordance with various embodiments herein, a method, workflow, and system are provided for an approval sequence which safely and intuitively transfers operational control from a human (supervisor or operator) to an autonomous work machine. This can include a specific workflow that transfers control of an agricultural machine from a supervisor in or out of the cab to the autonomy systems (robotic controller) of agricultural machine. In one example, the system includes an application executing on a mobile device held by a supervisor or operator of the work machine in proximity to the work machine. The application and user interface provide steps to safely and intuitively allow autonomous control to begin. Various aspects include the particular checks and interaction with the user interface of the mobile device and the autonomous machine in an understandable method and/or flow that keeps the supervisor/operator informed and in control, while allowing the autonomous work machine to perform safely at the start of a mission.

Figure 2:
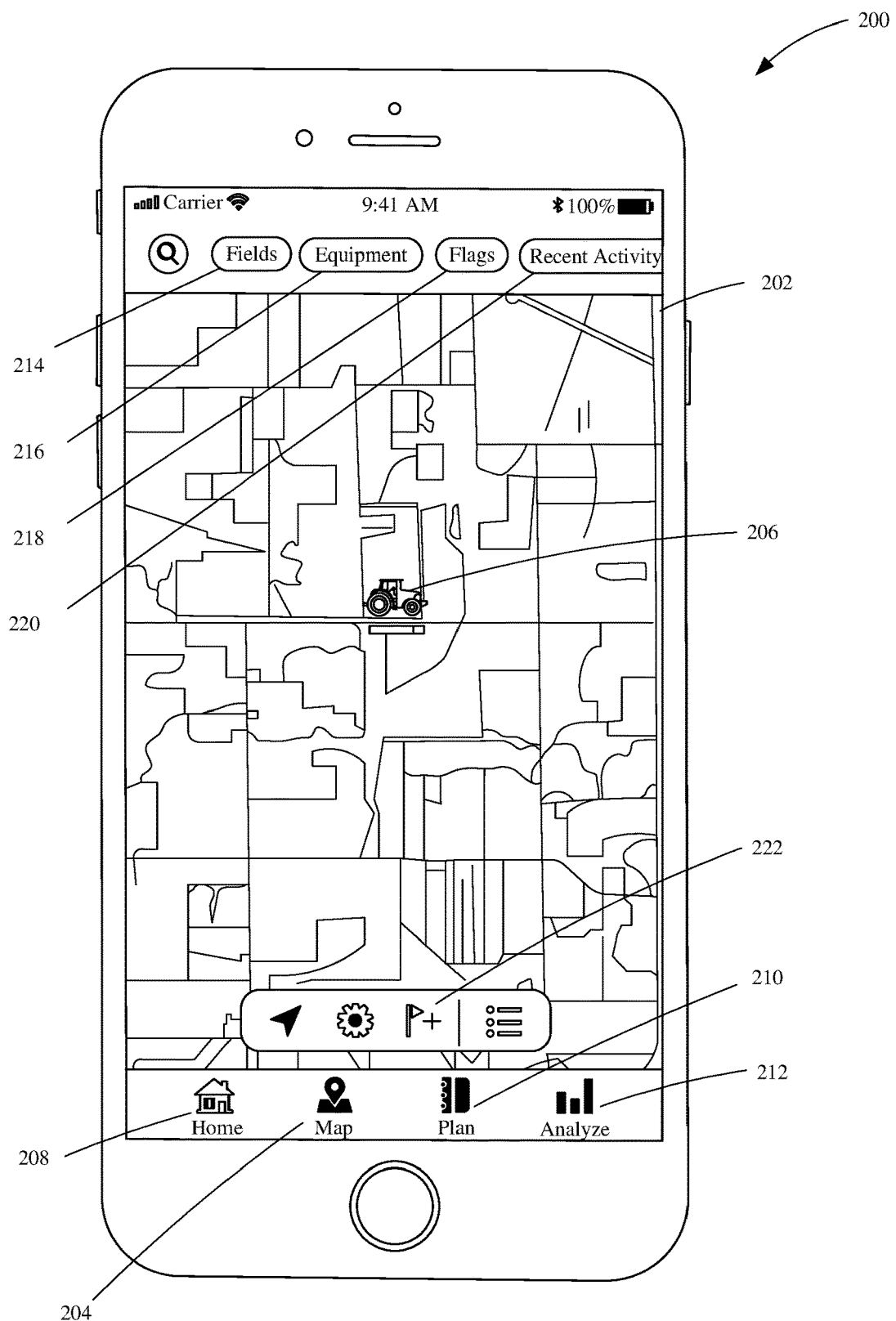
FIG. 2 is a diagrammatic view of an exemplary mobile device executing an autonomy management application in accordance with one example.

FIG. 2 is a diagrammatic view of an exemplary mobile device 200 executing an autonomy management application in accordance with one example. As can be seen, screen 202 of mobile device 200 is currently showing an active tab "map" 204 which, when selected, displays a map of the surrounding area, with an autonomous work machine, illustrated diagrammatically as a tractor 206 located on the map. While the mobile device 200 illustrated in FIG. 2 is a smartphone, it is expressly contemplated that any suitable mobile device having wireless communication, and a user input/output mechanism, can be used. For example, mobile device 200 can be a laptop computer, a notepad, a PDA, or a dedicated hardware system. The application also includes a number of other inactive tabs including Home tab 208, Plan tab 210, and Analyze tab 212. When in the map mode, the view can be changed to display or not display certain elements of interest. For example, as shown in FIG. 2, elements include Fields 214, Equipment 216, Flags 218, and Recent Activity 220. Additionally, as shown in FIG. 2, using the application executing upon the mobile device, the user can specifically add a flag to the map by pressing user input mechanism 222.

Figure 3:
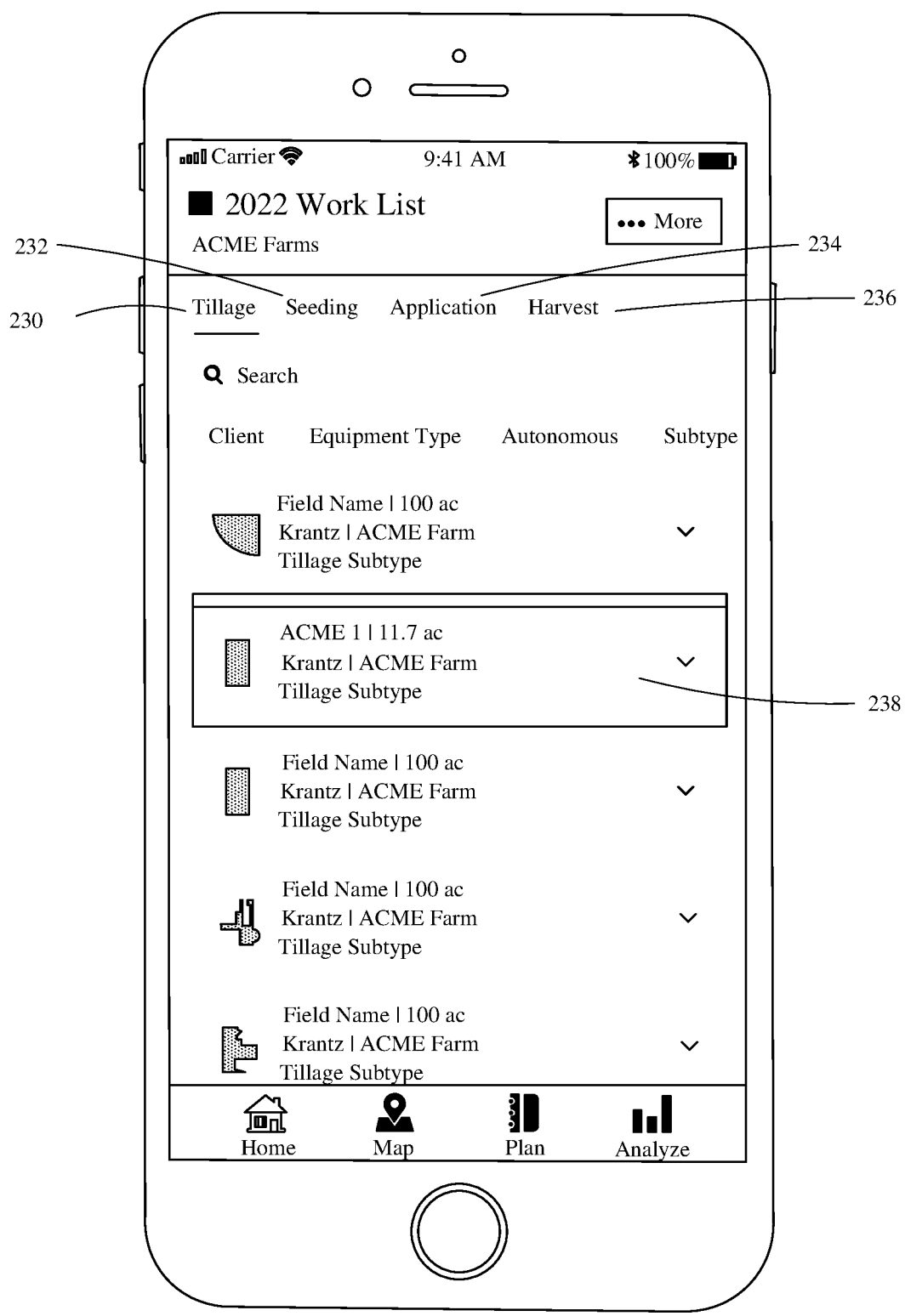
FIG. 3 is a diagrammatic view of an exemplary mobile device executing an autonomy management application showing an operational plan for a worklist for a hypothetical farm.

When the user of mobile device 200 selects Plan tab 210, the application transitions to the view shown in FIG. 3. In FIG. 3, the plan for a 2022 worklist is shown for a hypothetical farm entitled ACME Farm. In the illustrated plan, various agricultural operations can be selected via tabs 230, 232, 234, and 236. As shown, tab 230 displays tillage work for the plan while tab 232 will display seeding work for the 2022 worklist plan. Similarly, tab 234 will display application operations for the worklist plan, while tab 236 will display harvest operations. In the illustrated example, tab 230 has been selected and a number of fields are displayed to the user which require tillage operations. Further, the user has selected field ACME 1, illustrated as having 11.7 acres as indicated at reference numeral 238.

Figure 4:
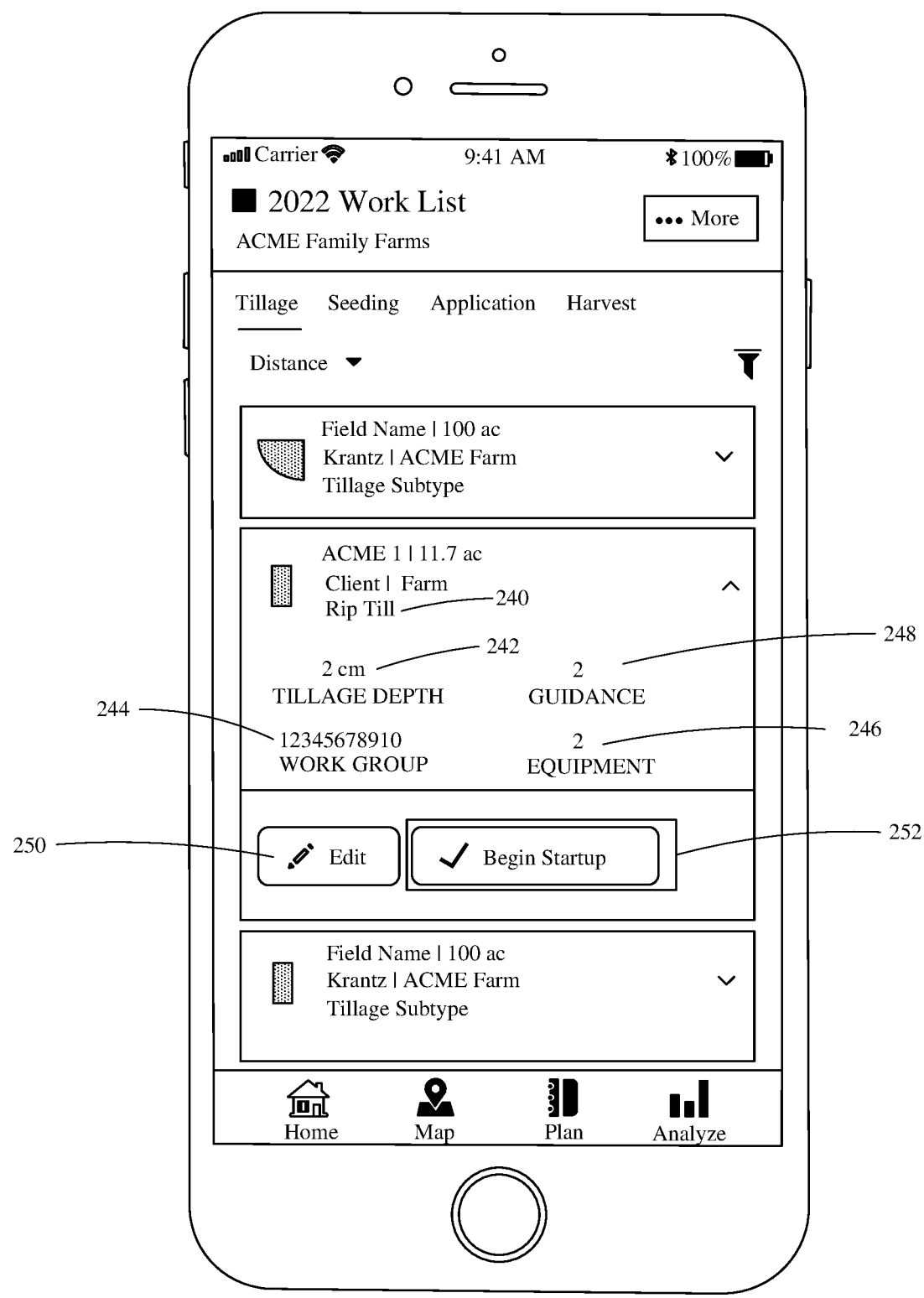
FIG. 4 is a diagrammatic view of an exemplary mobile device executing an autonomy management application showing a tillage operation for a selected field.

When the user selects a particular field, such as field 238 as shown in FIG. 3, the application executing on the mobile device transitions to the view set forth in FIG. 4. As can be seen, further details with respect to the tillage operation for the selected field are provided in FIG. 4. Specifically, the type of operation is a rip till, as indicated at reference numeral 240. Additionally, the tillage depth is set at 2 cm as indicated at reference numeral 242. The work group for the field is illustrated in field 244 while the number of autonomous equipment assets assigned to the operation is indicated at field 246. Additionally, guidance field 248 indicates guidance relative to the till operation. Should the user wish to edit any of the parameters of the till operation, a user interface element 250 can be selected which allows the user to edit the till operation. When the user is satisfied with the parameters for the operation, the user selects user interface element 252 indicated as "begin startup" to initiate the autonomous tillage operation. When this occurs, the autonomy startup method and techniques using the user's mobile device begin, and the display transitions to that shown in FIG. 5.

Figure 5:
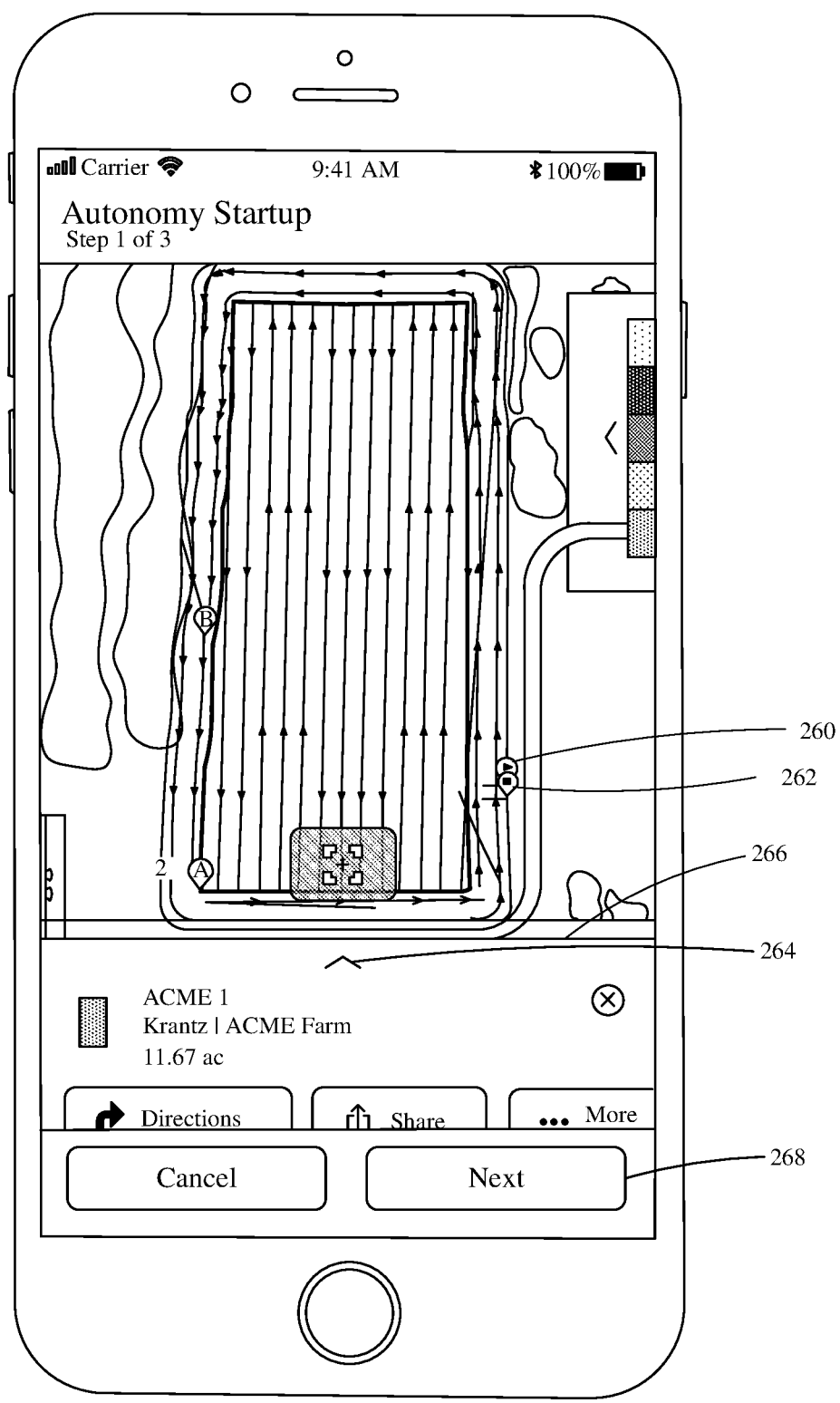
FIG. 5 is a diagrammatic view of an exemplary mobile device executing an autonomy management application showing a first step of an autonomy startup procedure for a selected operation in accordance with one embodiment.

FIG. 5 shows step 1 of an autonomy startup procedure for a selected operation in accordance with one embodiment. As shown, a display of the selected field is shown on a map. In the illustrated example, this is a satellite map. Further, the pathing of the autonomous machine is overlaid upon the map view. This pathing information may be provided to robotic controller 104, but is generally considered a priori information relative to the autonomy startup. In the illustrated example, a start location for the operation is indicated at reference numeral 260 with a stop location indicated at reference numeral 262. Additionally, some of the pathing information may be color-coded in order to indicate to the user certain types of passes. For example, such passes may include Field Row passes, End Turns, Headland passes, Transitions, and Passables, for example. Additionally, the application may include a further details user interface element 264, that, when actuated, slides panel 266 upwardly illustrating additional details relative to the tillage operation. For example, such details may include path details which may further include total length, engaged length, total time, end turns, and area covered. Additionally, details may include machine details and/or autonomy settings. In this view, the user may make changes to machine details and/or autonomy settings as desired. When satisfied with the settings and pathing, the user selects user interface element 268 to move to the next step.

Figure 6:
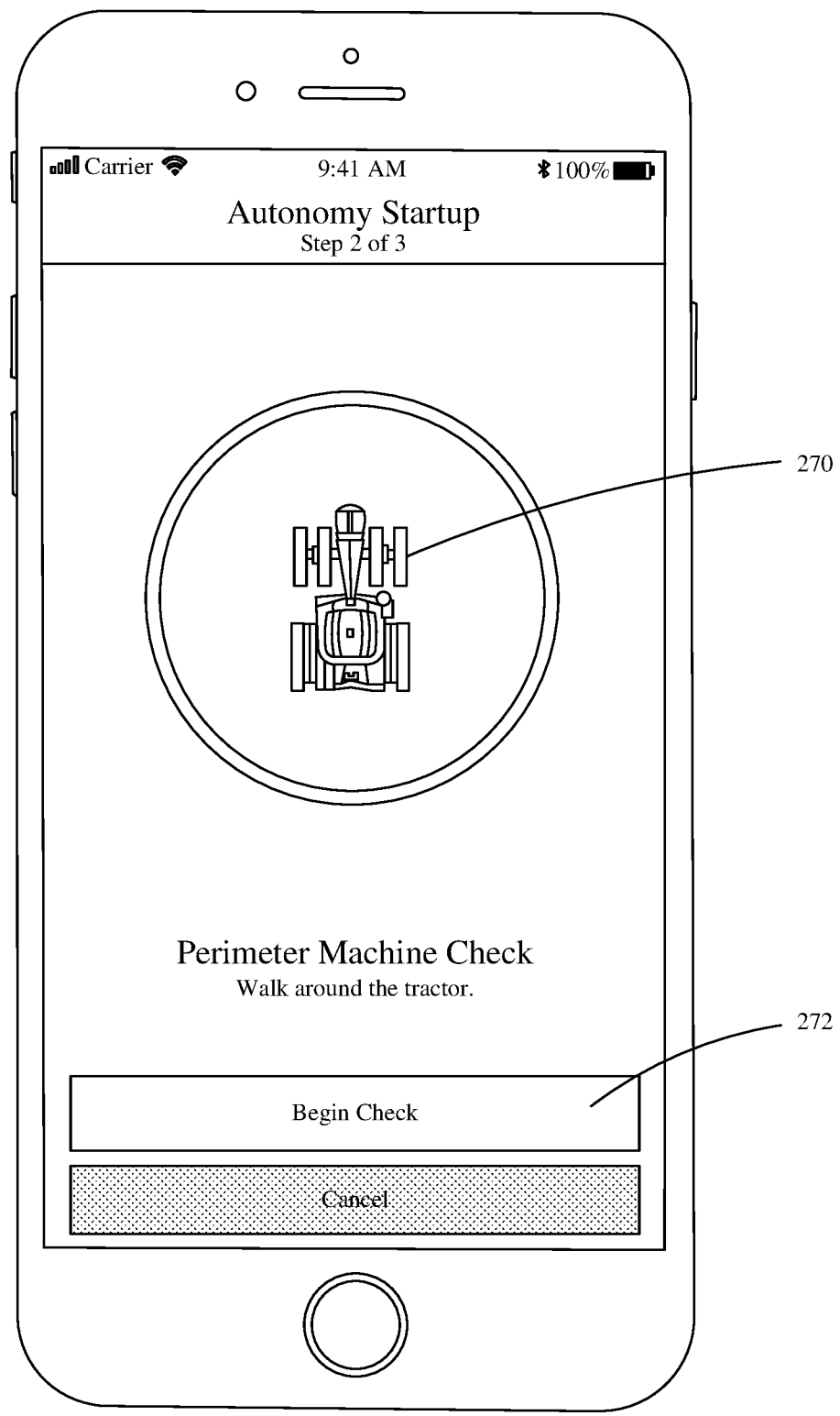
FIG. 6 is a diagrammatic view of an exemplary mobile device executing an autonomy management application showing a second step of an autonomy startup procedure in accordance with one embodiment.

FIG. 6 is a view of the autonomy application executing upon a mobile device in accordance with one embodiment. As shown, the mobile application has transitioned once the user selected user interface element 268 (shown in FIG. 5) to autonomy startup step 2 of 3. In this step, a diagrammatic view of the work machine is shown. In this particular example, the work machine is a tractor 270. It is important to ensure reasonable user proximity to the work machine before motion is initiated. This helps ensure that work machine motion is not started without a responsible user in the proximity of the work machine. In one example, autonomy startup includes determining that a user is within a pre-determined distance of the work machine. This detection of user proximity is preferably done using data of the mobile application and/or the work machine. In a first example, GPS coordinates from the mobile device (obtained using a GPS sensor in the mobile device) are compared with GPS coordinates from the work machine (obtained from position detection system 132) to determine a distance between the two device. If the determined distance is within a pre-determined distance, such as 1500 feet, the user is deemed sufficiently close to the work machine to begin work machine motion. Another way the user proximity can be detected, is determining whether a WiFi signal from the work machine is detectable by the mobile device. Thus, in this example, if the mobile device can detect the Wifi signal of the work machine, the user is deemed to be sufficiently close to the work machine to begin work machine motion. In yet another example, one or more cameras on the work machine detect the user either standing by the work machine, or walking around it. When the user is detected by a camera of the work machine, the user is deemed sufficiently close to the work machine to begin work machine motion.

In the example shown in FIG. 6, the application instructs the user to "walk around the tractor." When the user is ready to begin this task, the user selects user interface element 272. When this occurs, the view of the application transitions to that shown in FIG. 7.

Figure 7:
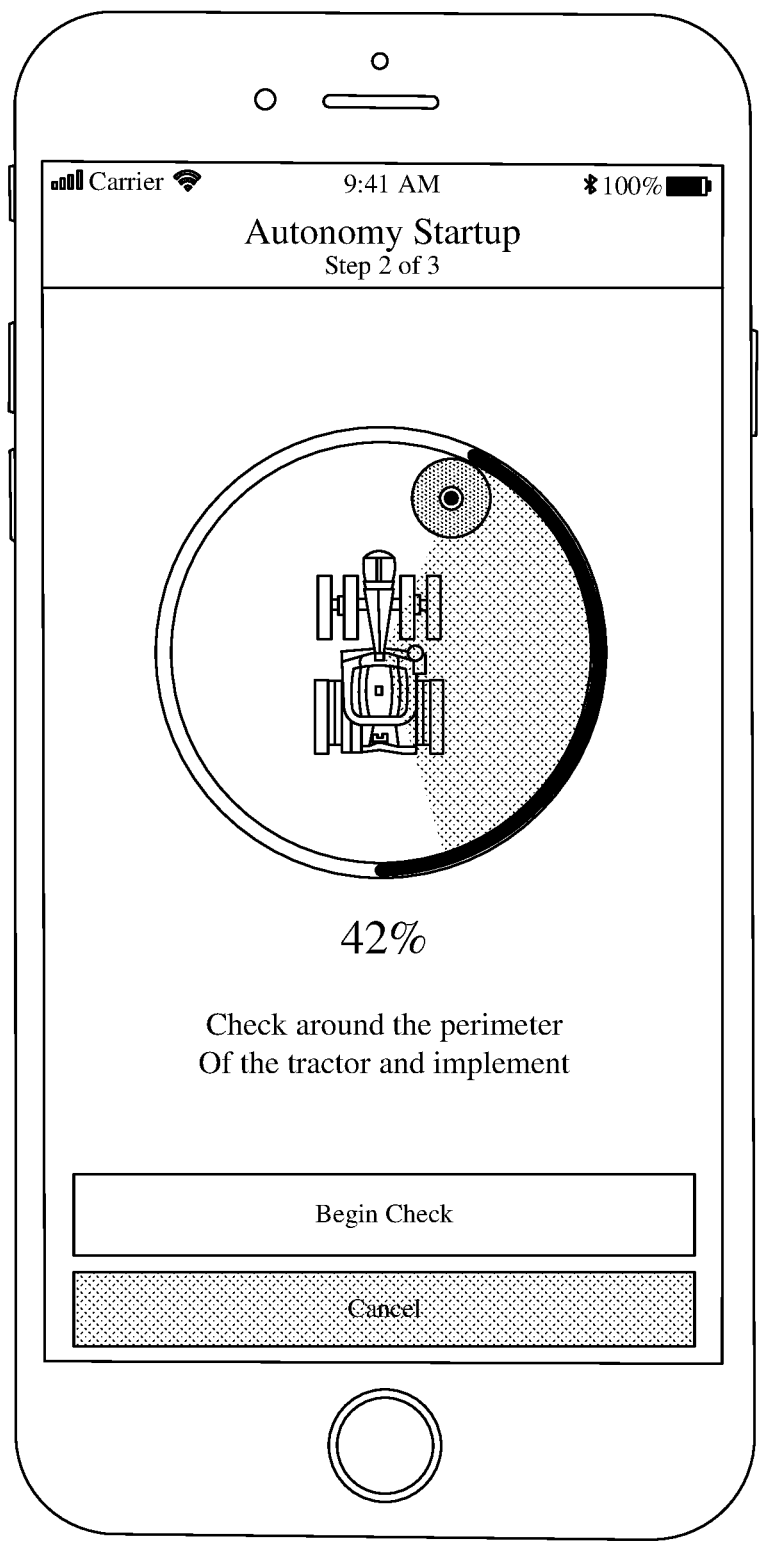
FIG. 7 is a diagrammatic view of an exemplary mobile device executing an autonomy management application showing that a user has initiated a proximity check, such as a perimeter machine check, and is walking around the tractor and implement, in accordance with one embodiment.

In FIG. 7, the user has initiated the perimeter machine check and is walking around the tractor and implement. As the user does this with the mobile device, the robotic controller tracks the user's position using one or more sensors 140. In one example, cameras on the work machine provide images to robotic controller 104, which processes the images to identify the user in the images as the user walks around the work machine. Additionally, the display of the mobile device is preferably updated in substantially real-time to show the user's progress walking around the perimeter. In the example shown in FIG. 7, the progress is 42%. Once the user has completed the perimeter check, the autonomy startup sequence transitions to that shown in FIG. 8.

Figure 8:
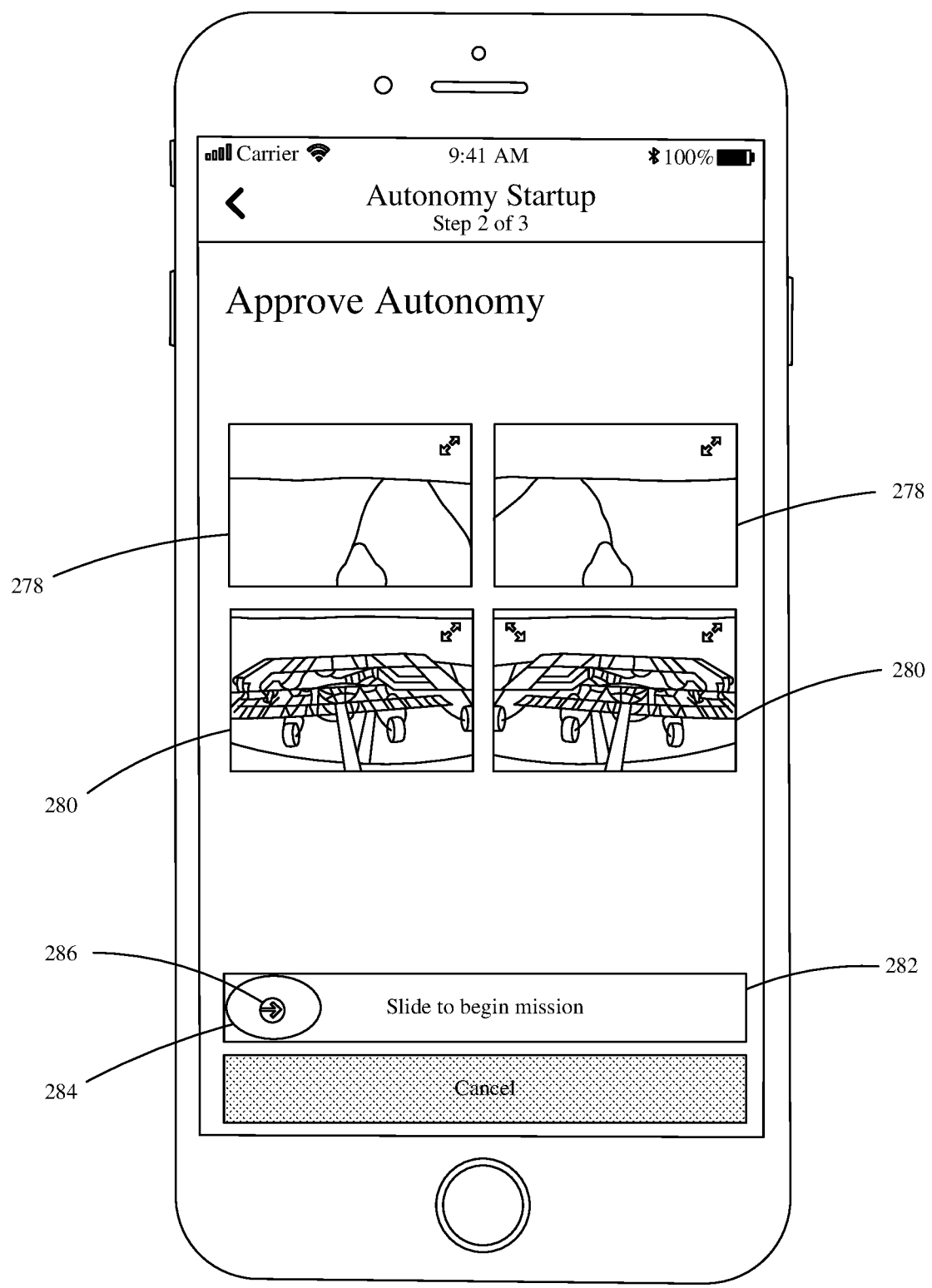
FIG. 8 is a diagrammatic view of an exemplary mobile device executing an autonomy management application showing one or more images displayed to the user in accordance with one embodiment.

Once the perimeter check is complete, the autonomy startup method transitions to the display shown in FIG. 8. In this display, one or more front images 278 from cameras on the machine are displayed to the user along with one or more implement or rear images 280. Based on the perimeter check and the review of the displayed images, if the user continues to believe that the machine is ready to begin autonomous operation, the user engages input mechanism 282 in order to initiate the autonomy mission. In the illustrated example, this input mechanism is a "slide to begin mission" mechanism that requires the user to place his or her finger on element 284, and to slide the element in the direction by arrow 286. This particular input type is helpful to prevent the user from inadvertently from pressing a soft button. Thus, the specific user input to engage autonomy is preferably a more complicated input than a simple button press. When the user engages slide to being user input 282, the autonomy startup method transitions to that shown in FIG. 9.

Figure 9:
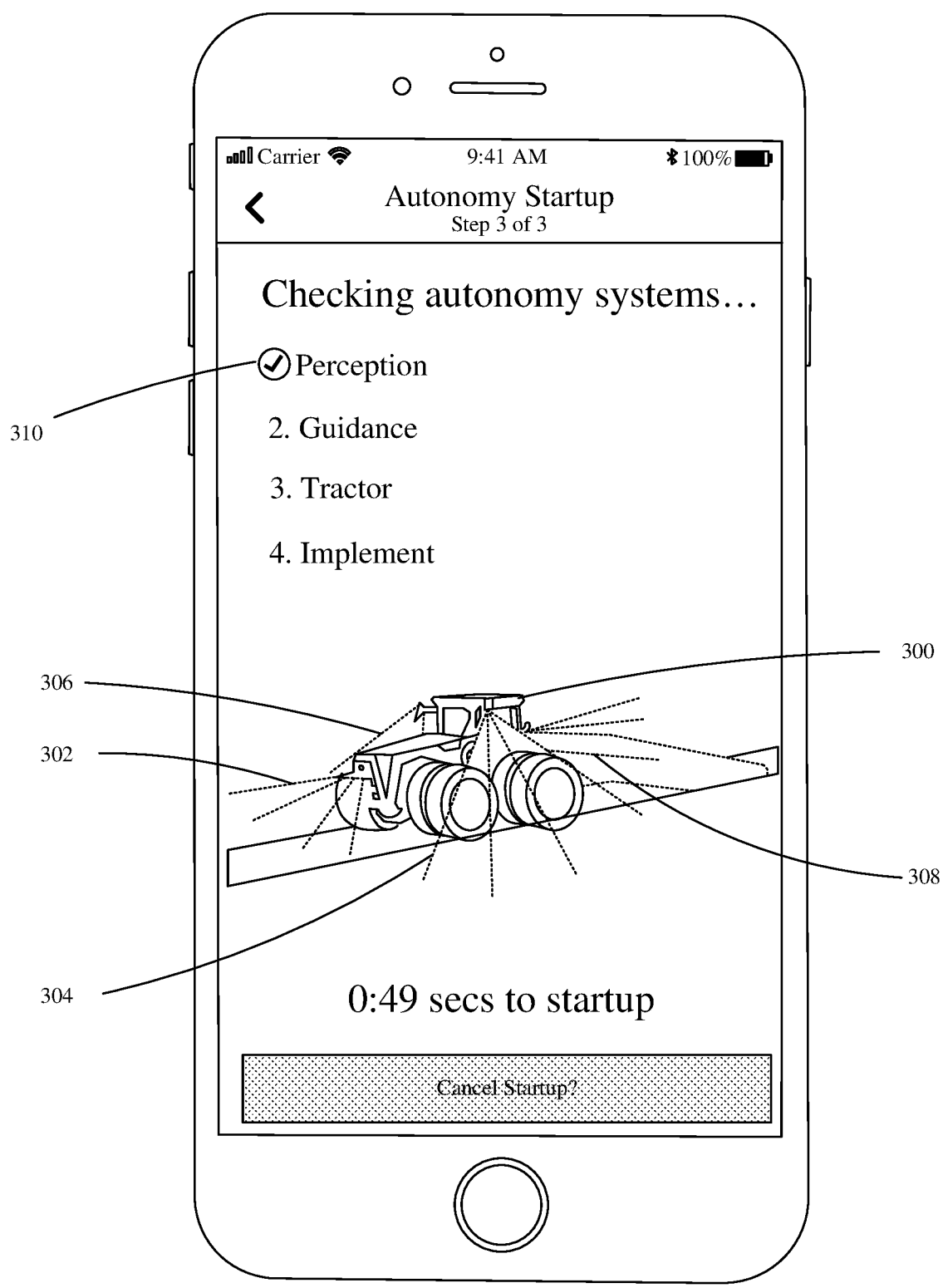
FIG. 9 is a diagrammatic view of an exemplary mobile device executing an autonomy management application showing a third step of an autonomy startup procedure in accordance with one embodiment.

FIG. 9 is a diagrammatic view of an application executing upon a mobile device during autonomy startup in accordance with one embodiment. In the illustrated example, a diagrammatic view of the work machine is shown, as indicated at reference numeral 300. Additionally, the status of the autonomy systems check is provided to the user as well as a countdown to autonomy startup. In the example shown in FIG. 9, the robotic controller is checking the various perception systems of the work machine. These are the sensors and/or systems that allow robotic controller 104 to sense the area around it. As set forth above, this may include one or more cameras that operate in the visible spectrum, ultrasonic sensors, LIDAR sensors, RADAR sensors, et cetera. During this test, all such perception sensors are tested to determine if they are functional and working appropriately. Additionally, the application shows diagrammatic views of the various perception sensors that are being tested. For example, FIG. 9 illustrates a front view 302 is being tested along with left and right-side views 304, 306, respectively, and an implement view 308. When all such perception systems have passed the check, a check mark indicated at reference numeral 310. If any of the perception systems did not pass the check, the application indicates an alert, such as an exclamation point or stop sign by the perception text on the screen, as well as an indication of the perception system or systems that did not pass the check. Once the perception system check is completed, robotic controller begins testing the guidance system. When this occurs, the display on the mobile device transitions to that shown in FIG. 10.

Figure 10:
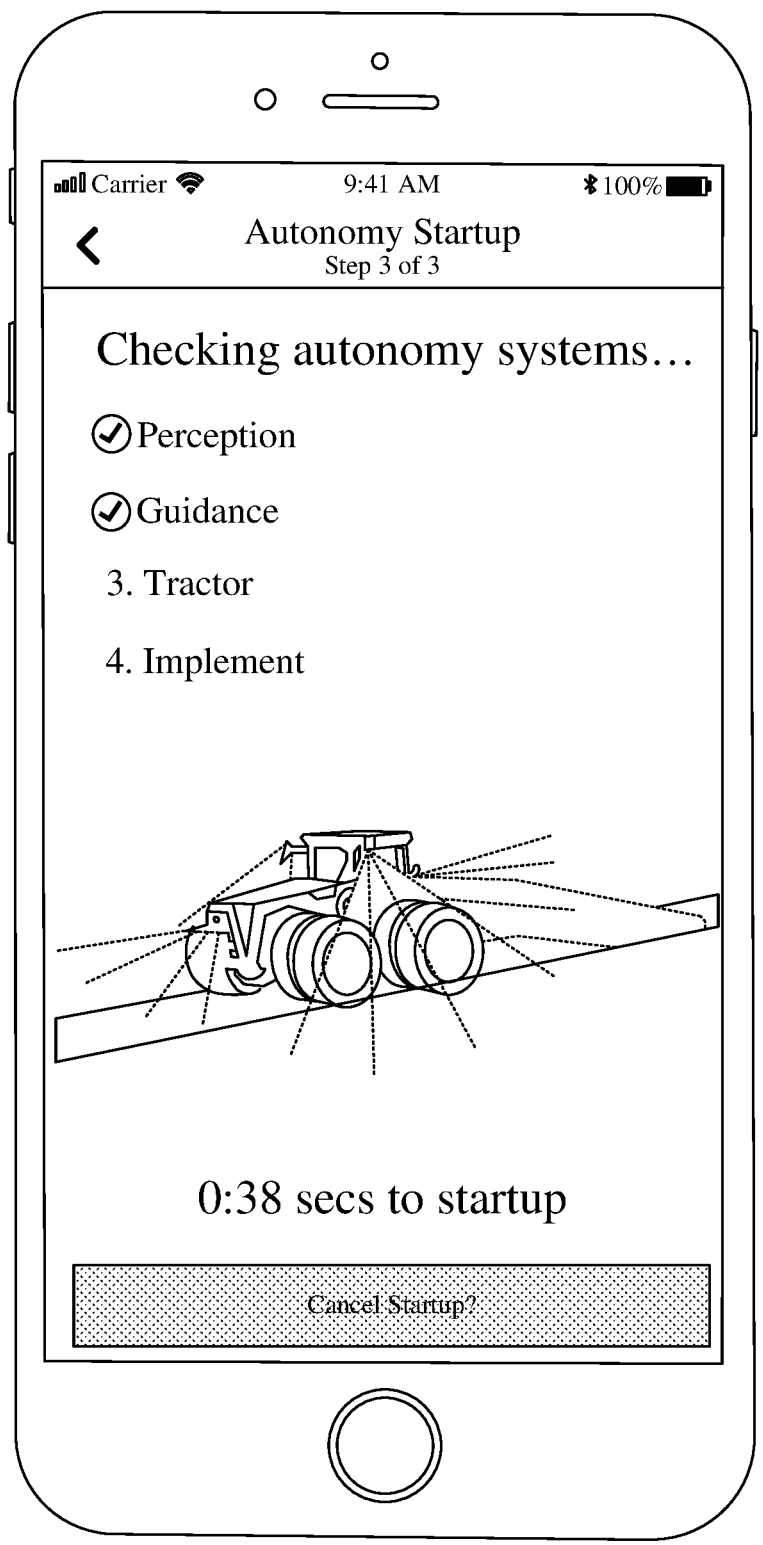
FIGS. 10-13 are a diagrammatic view of an exemplary mobile device executing an autonomy management application showing feedback provided to a user while an autonomous machine performs various checks pursuant to an autonomy startup procedure in accordance with one embodiment.

FIG. 10 is a diagrammatic view indicating that robotic controller 104 is checking guidance systems. Additionally, a countdown timer to autonomy startup is updated to show time left before autonomy begins. The guidance systems include any system that provides a positional signal to the robotic controller. As described in FIG. 1, this position detection system 132 can take various forms including using GPS information, or other suitable guidance information. In the example shown in FIG. 10, all guidance systems have passed the check, and the autonomy checking proceeds to the display shown in FIG. 11.

Figure 11:
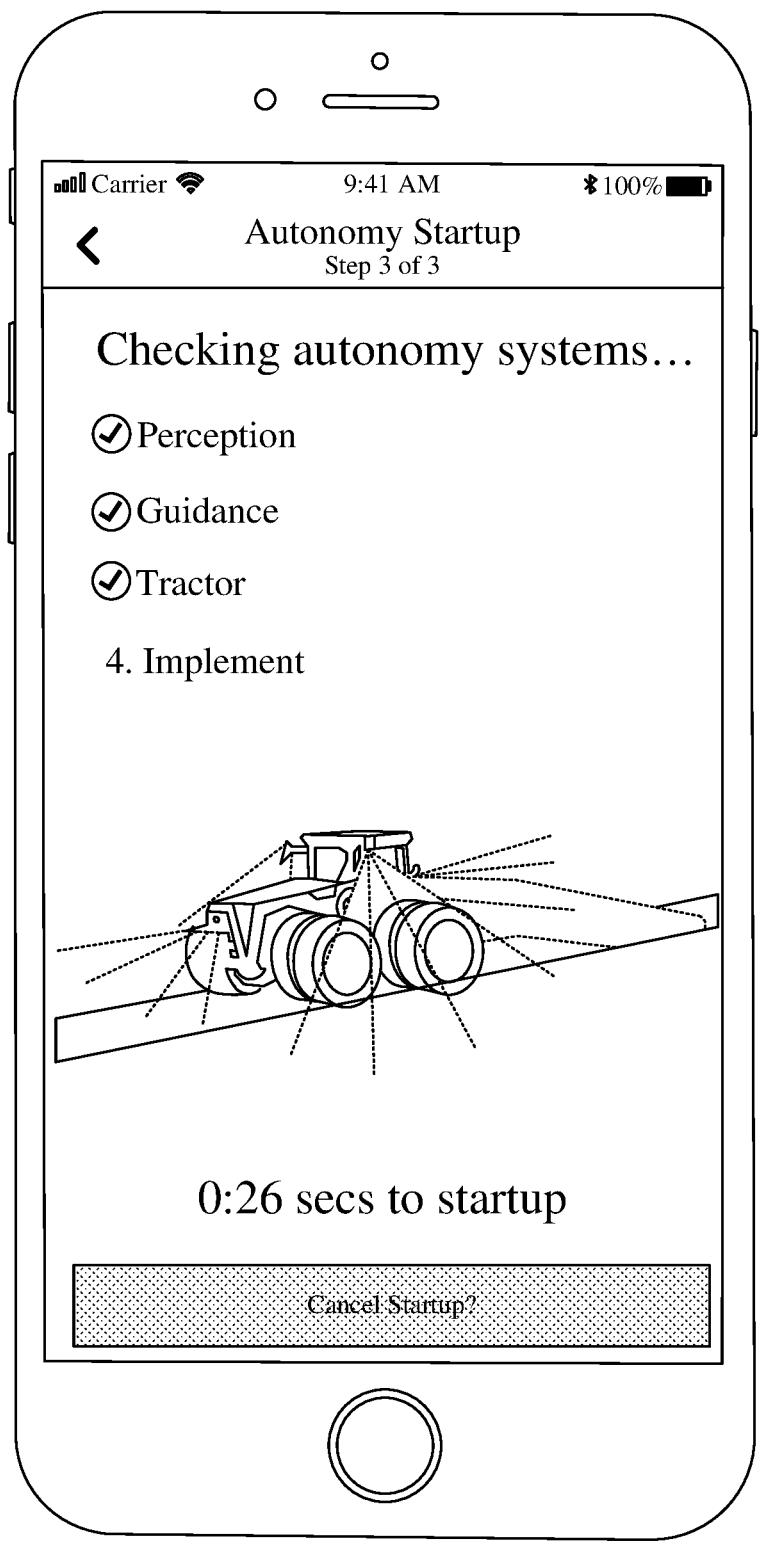

FIG. 11 has updated the countdown timer to autonomy startup and includes an indication that autonomy systems include checking the various tractor systems. These are the subsystems of controlled system 102, illustrated in FIG. 1. Such checks include determining that the prime mover is available (e.g., an internal combustion engine is running) and operating within appropriate parameters. Further, tractor system check may include determining that suitable hydraulic pressure is available, et cetera. If all systems of the controlled system pass the relevant checks, the autonomy startup sequence transitions from that shown in FIG. 11, to that shown in FIG. 12.

Figure 12:
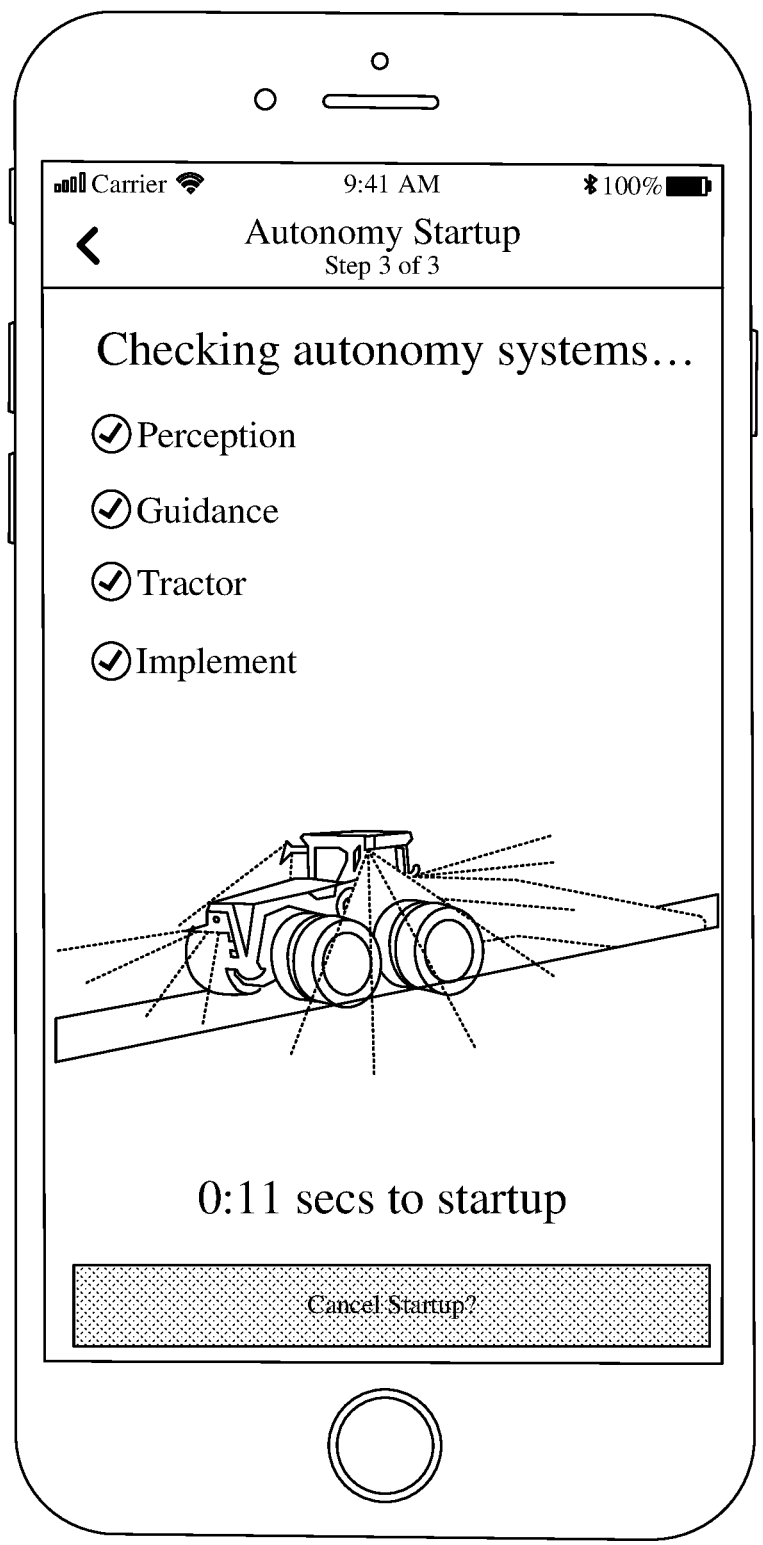

In FIG. 12, robotic controller 104 checks one or more systems of the implement. This may include determining whether actuators on the implement are actuatable or any other subsystems of the implement. If the implement subsystems check out appropriately, the display on the mobile device changes to that of FIG. 13.

Figure 13:
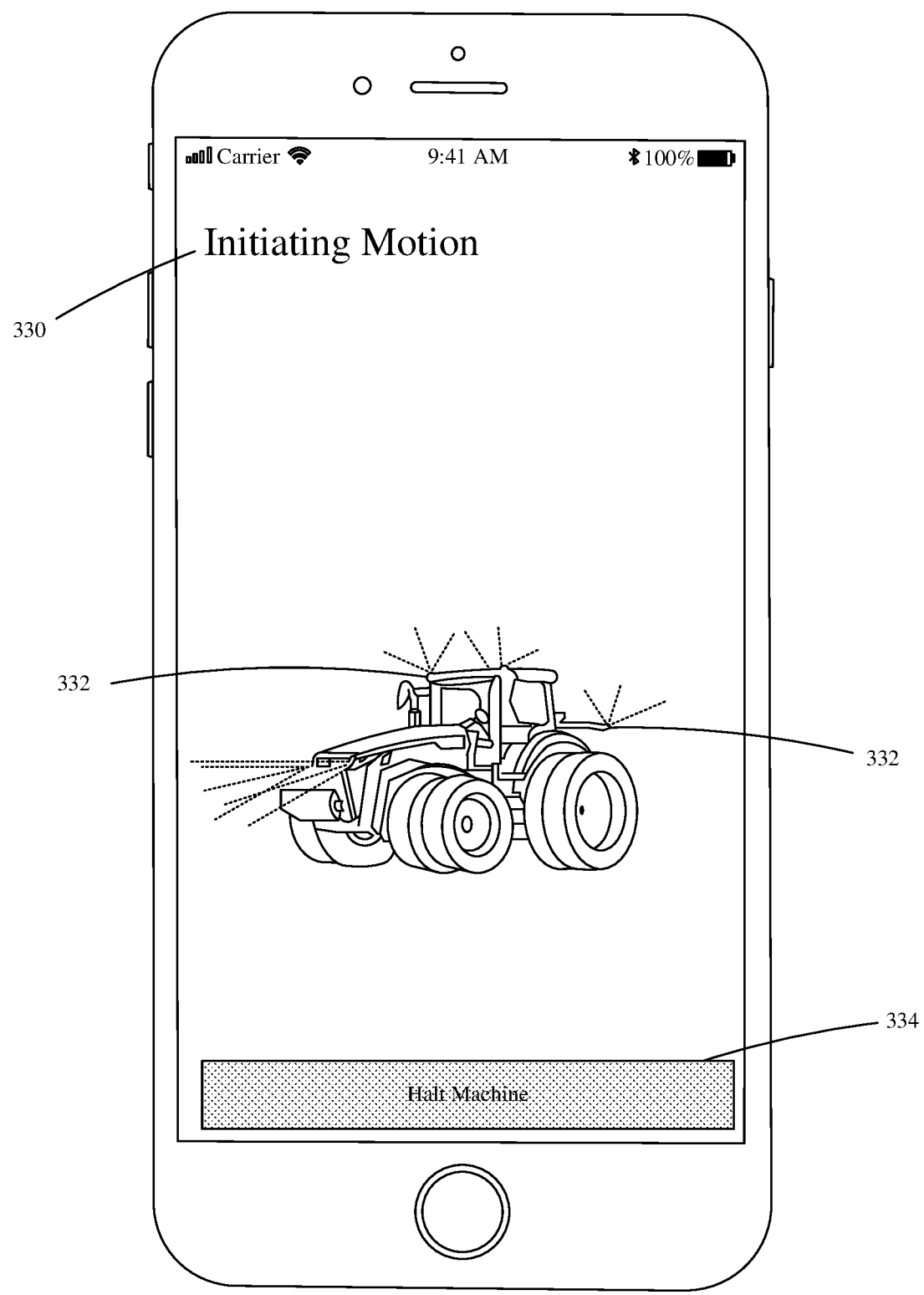

FIG. 13 is a view of an application executing upon a mobile device in accordance with one embodiment. As shown in FIG. 13, when the autonomous work machine passes all of the autonomy system checks illustrated above, the work machine will begin initiating motion. This state is indicated to the user on mobile device 200 at reference numeral 330. Additionally, the application shows the work machine as flashing or otherwise engaging a number of lights 332 on the work machine. Preferably, these lights also flash on the real world work machine. Further, the mobile device also provides a user interface element 334 that, when selected, causes the machine to halt operation. For example, the user may determine that some aspect of the operation is incorrect, or may wish to make changes, the user can simply press user interface element 334 to halt machine operation. When this occurs, changes can be made to the operation and/or autonomous machine. However, in order for autonomy to begin again, the autonomy approval sequence must be performed again.

Figure 14:
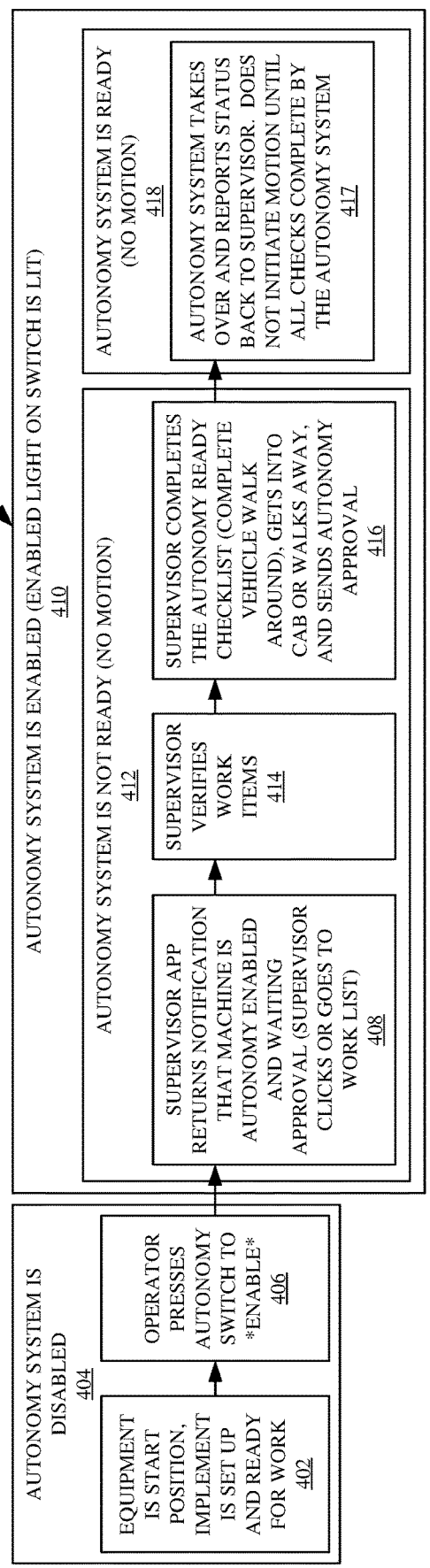
FIG. 14 is a flow diagram of a computer-implemented method of performing autonomy approval in accordance with one embodiment.
Figure 15:
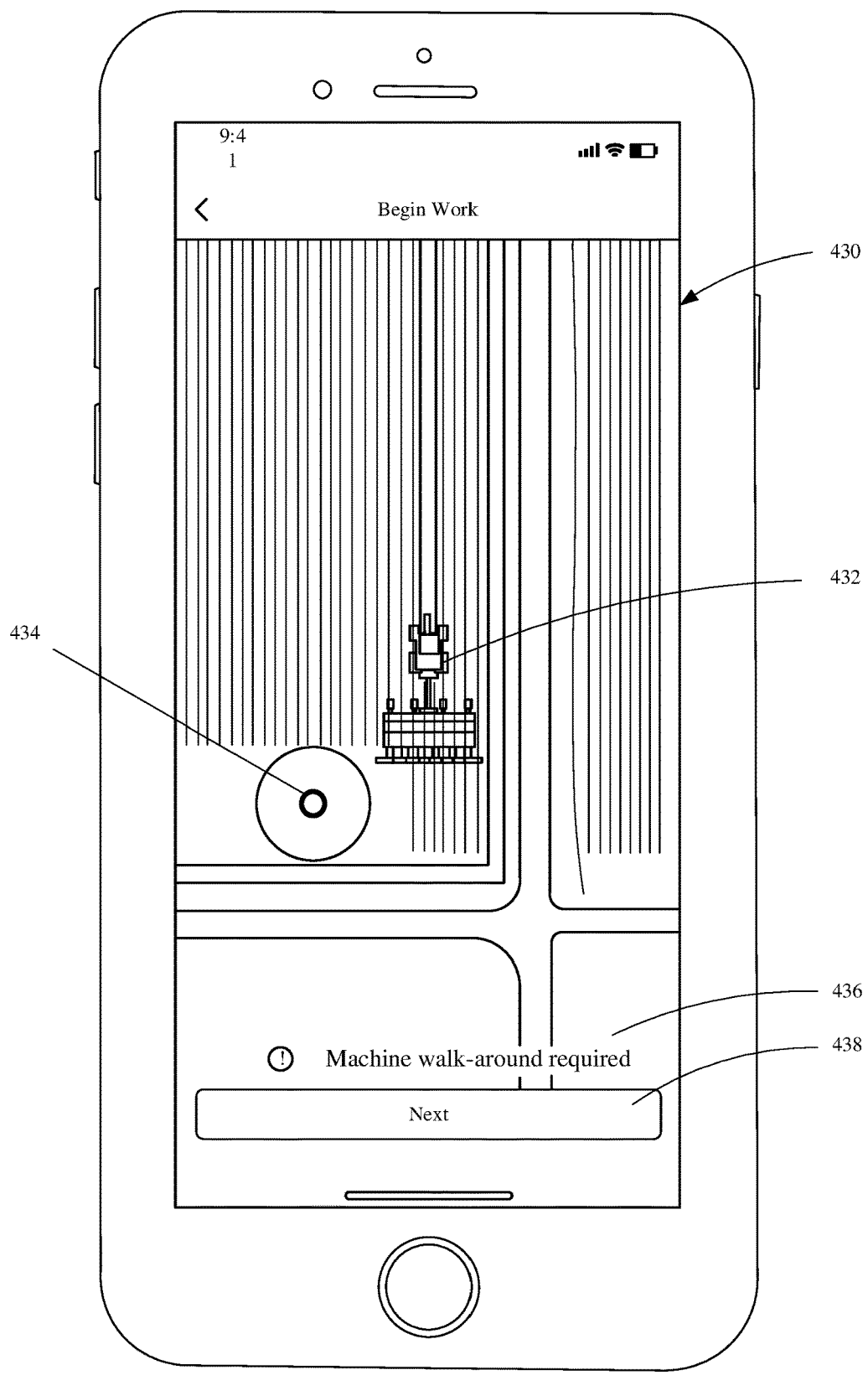
FIGS. 15-18 are diagrammatic views of an exemplary mobile device executing an autonomy management application autonomy startup procedure in accordance with another embodiment.

FIG. 14 is a flow diagram of a computer-implemented method of performing autonomy approval in accordance with one embodiment. Method 400 begins at block 402 where the autonomy equipment is placed in a start position and the implement is setup and ready for work. The start position may be a pre-defined start position indicated on a map, such as position 260 (shown in FIG. 5). Additionally, status box 404 indicates that while block 402 is executing, that the autonomy system is disabled. Next, at block 406, the user presses an autonomy switch to enable. This switch may be a user interface element, such as user interface element 252 shown in FIG. 4 relative to a particular field operation.

Once the autonomy switch to enable has occurred, control passes to block 408. Additionally, status box 410 indicates that the autonomy system is enabled, and preferably an enable light on a switch is lit. However, as indicated at block 412, the autonomy system is not yet ready and is not in motion. At block 408, the supervisor application executing on the user's mobile device returns a notification that autonomy is enabled and waiting for approval. This is indicated in FIG. 5 at autonomy startup heading shown at the top of FIG. 5. At this step, the user or supervisor clicks or enters the work list displayed therein. For example, the user may view the work list and the map and pathing in order to verify. Further, as indicated at block 414, the user also verifies various work items. At block 414 the user has verified the various work items, and the method transitions to the next step, as indicated in FIG. 5 by pressing soft button 268. When this occurs, method 400 transitions to block 416 where the user completes the autonomy ready check list.

The first step of the autonomy ready check list is to perform the perimeter check. As set forth above, the user proximity can be detected by instructing the user to walk around the autonomous machine and any implement connected thereto. Preferably, this check is actively tracked by the robotic controller and feedback on the progress on perimeter check is provided in real-time to the user. When the check is complete, the user may get into the cab of the autonomous vehicle or simply walk away, and then send autonomy approval. This may be done by sliding a "slide to begin" mission user interface element, such as element 282 shown in FIG. 8. When the autonomy approval has been received, robotic controller 104 transitions to the state shown at block 418 where the autonomy system is ready but not yet in motion. When this occurs, robotic controller 104 takes over and reports status back to the user relative to various system checks, as indicated at block 417. For example, the system checks can include perception, guidance, tractor, and/or implement. Robotic controller 104 does not initiate any motion whatsoever until all checks are complete. When all checks are complete, and all checked systems provide satisfactory results, then the autonomy system can transition to a ready (motion) state and begin its operation.

FIGS. 15-18 are diagrammatic views of an exemplary mobile device executing an autonomy management application autonomy startup procedure in accordance with another embodiment. In accordance with the alternate embodiment shown in FIGS. 15-18, when a user wishes to begin startup (such as by pressing user interface element 252—shown in FIG. 2) of an autonomy operation, a display executing on a user's mobile device may switch to that shown in FIG. 15. The display 430 of the mobile device depicts an overhead view of the work area with the autonomous work 432 centered on the display. In one example, the overhead view is a satellite view obtained from a remote server based on the location of the mobile device and/or autonomous work machine. Additionally, the location of the user is also preferably indicated on the display, as shown at reference numeral 434. As can be seen, in one example, the display informs the user that a "machine walk-around" is required, as indicated at reference numeral 436. When the user selects user interface element 438, the display transitions to that shown in FIG. 16.

Figure 16:
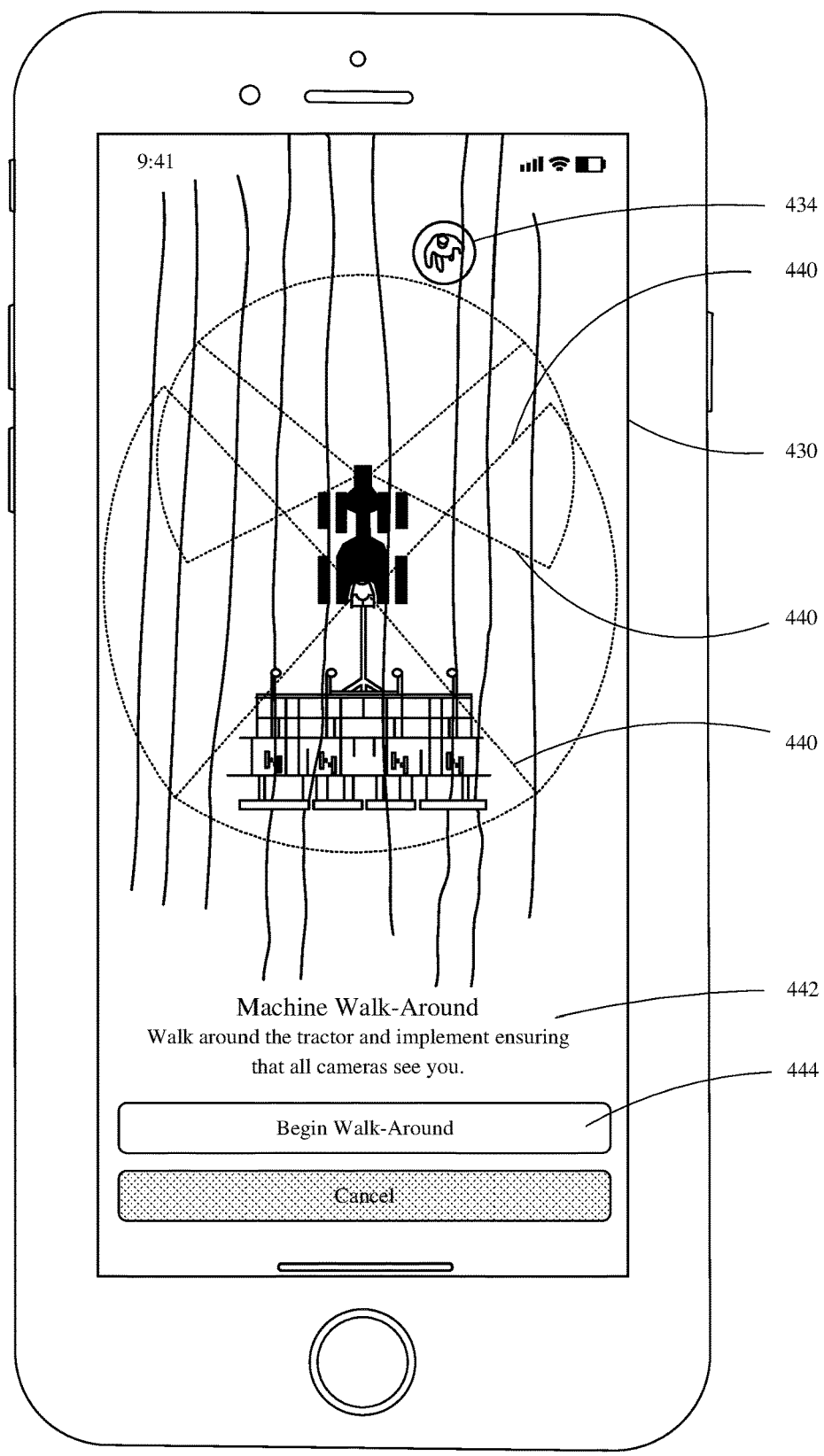

FIG. 16 is a diagrammatic screen view of an autonomy approval process running on a mobile device of a user in accordance with one embodiment. As shown, display 430 continues to depict the autonomous work machine in the center of the map while diagrammatic versions of fields of view for various cameras are shown, as indicated at reference numeral 440. Additionally, the position of the user is also preferably shown as indicated at reference numeral 434. The application informs the user that he or she must walk around the tractor and implement ensuring that all cameras see the user, as indicated at reference numeral 442. When the user is ready to begin the walk-around, the user selects user interface element 444 and display 430 transitions to that shown in FIG. 17.

Figure 17:
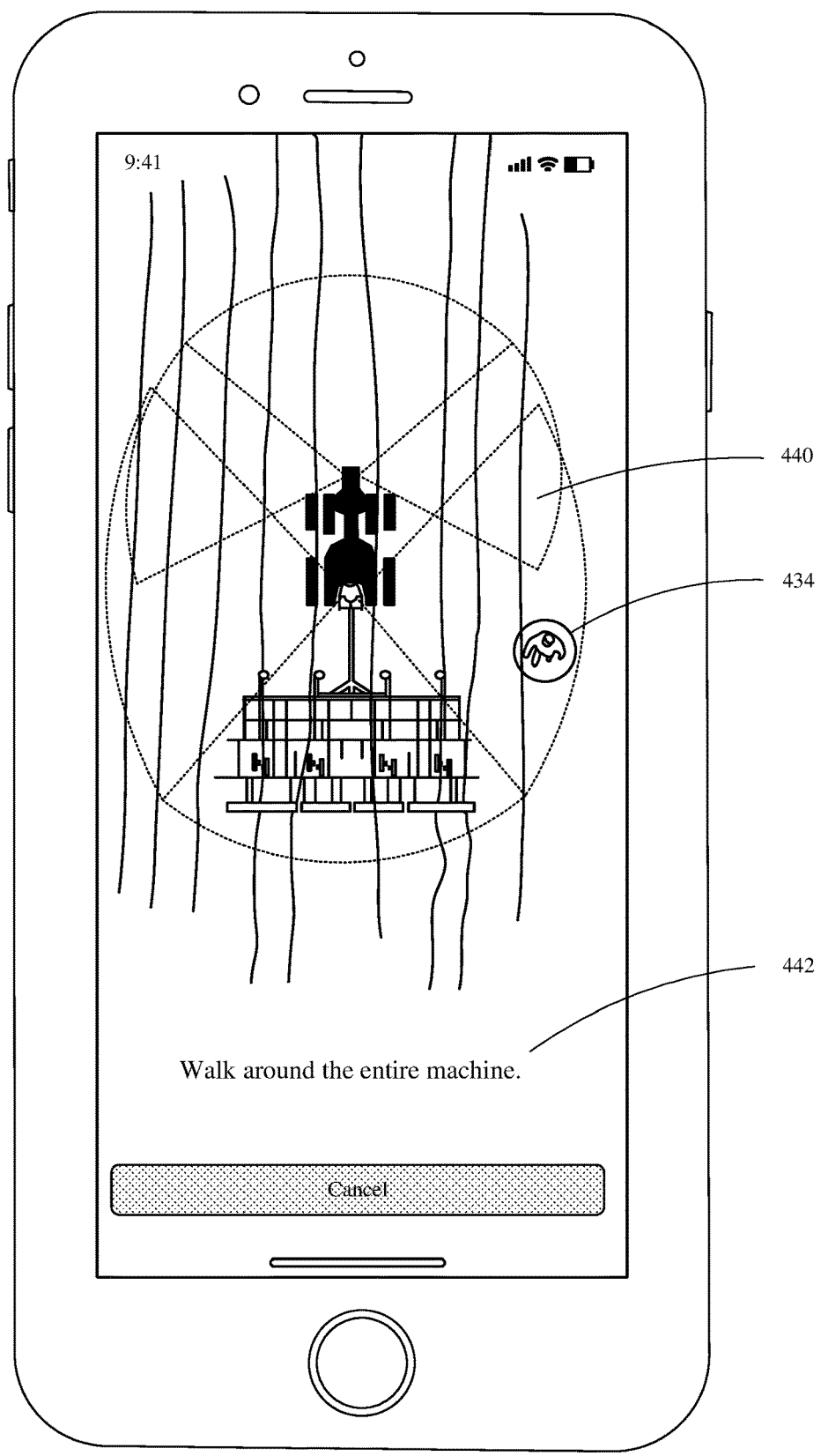

FIG. 17 is a diagrammatic screen view of an autonomy approval process running on a mobile device of a user in accordance with one embodiment. As can be seen in FIG. 17, as the user has moved from the position shown in FIG. 16, to the position shown in FIG. 17 (indicated at reference numeral 434), the fields of view 440 for the cameras in which the user's image has been detected have been changed. In one example, the fields of view where the user has been detected can have their color changed (e.g. to green, for example). In other examples, the depiction of the field of view could be made to flash or simply indicate "ok." Regardless, embodiments generally provide substantially real-time feedback of the walk-around process to the user. Additionally, as indicated at reference numeral 442, the user is instructed to "walk around the entire machine." This ensures two things, first the user will view the entire area surrounding the machine and ensure that the area and autonomous work machine is safe for autonomy to begin. Second, the process also ensures that all cameras of the autonomous work machine are functioning properly. Once all cameras have detected the user during the walk-around, display 430 transitions to that shown in FIG. 18.

Figure 18:
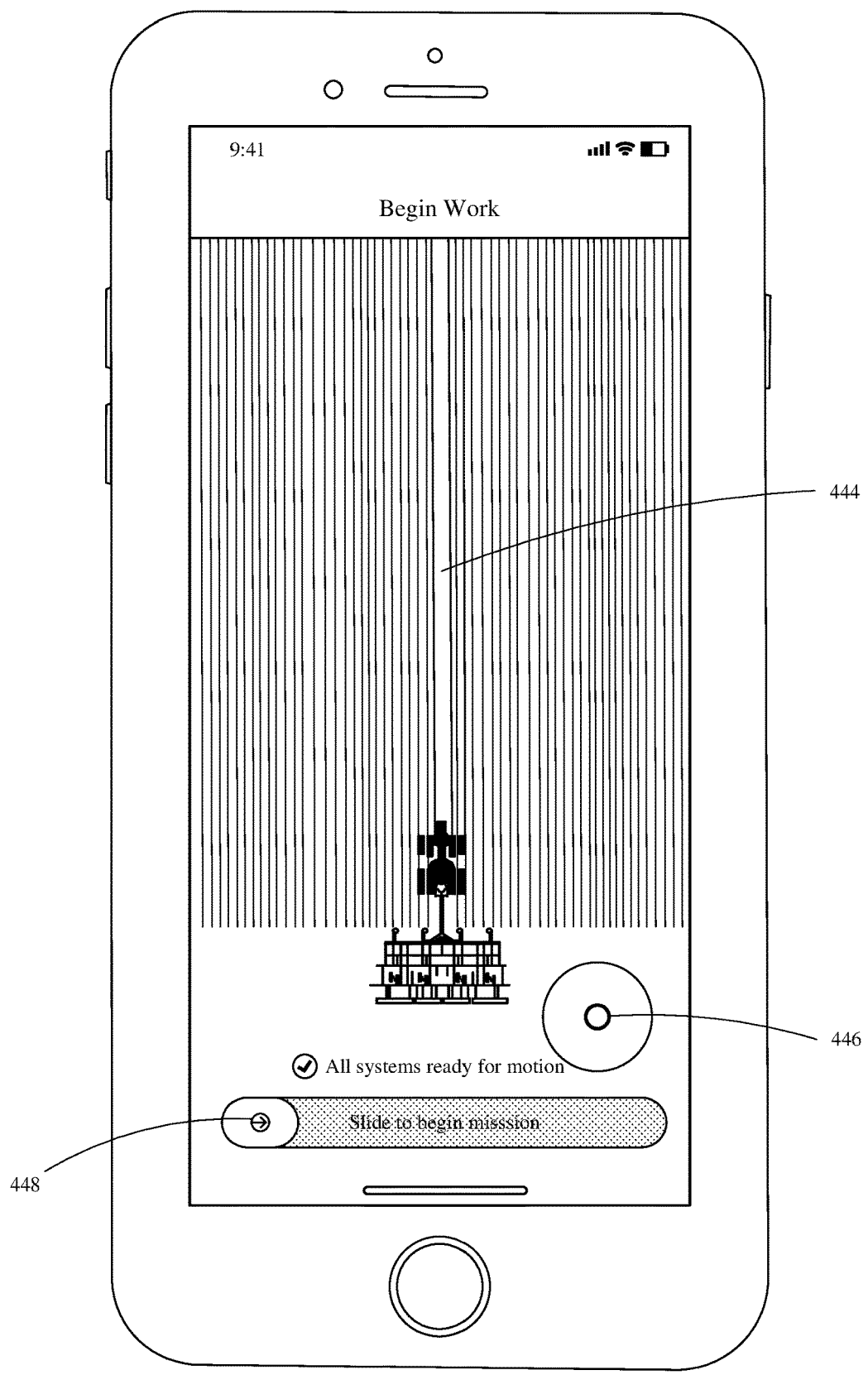

FIG. 18 is a diagrammatic screen view of an autonomy approval process running on a mobile device of a user in accordance with one embodiment. FIG. 18 displays after w walk-around process has completed successfully and shows the operator the projected initial path 444 of the autonomous work machine. Additionally, the work machine has also completed a self-diagnostic of its internal systems and provides the results of the diagnostic at reference numeral 446. In the illustrated example, all such internal system have passed the diagnostic and thus the work machine is ready for motion. In order to begin motion, the user swipes user interface element 448 to the right.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 19:
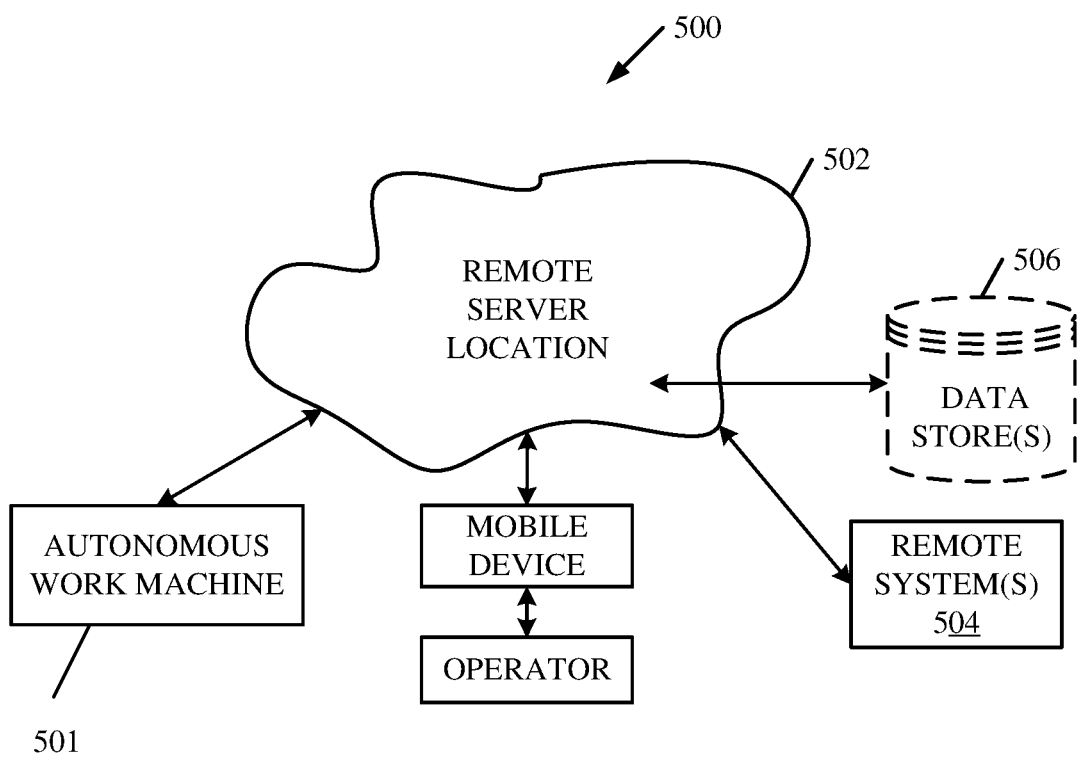
FIG. 19 is a block diagram of an autonomous work machine communicating with elements in a remote server architecture in accordance with one embodiment.

FIG. 19 is a block diagram of an autonomous work machine 501 communicating with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

FIG. 19 also depicts another embodiment of a remote server architecture. FIG. 19 shows that it is also contemplated that some elements of FIG. 1 are disposed at remote server location 502 while others are not. By way of example, remote storage (e.g. data store 506) can be disposed at a location separate from location 502 and accessed through the remote server at location 502. Regardless of where they are located, they can be accessed directly by the autonomous work machine, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 20:
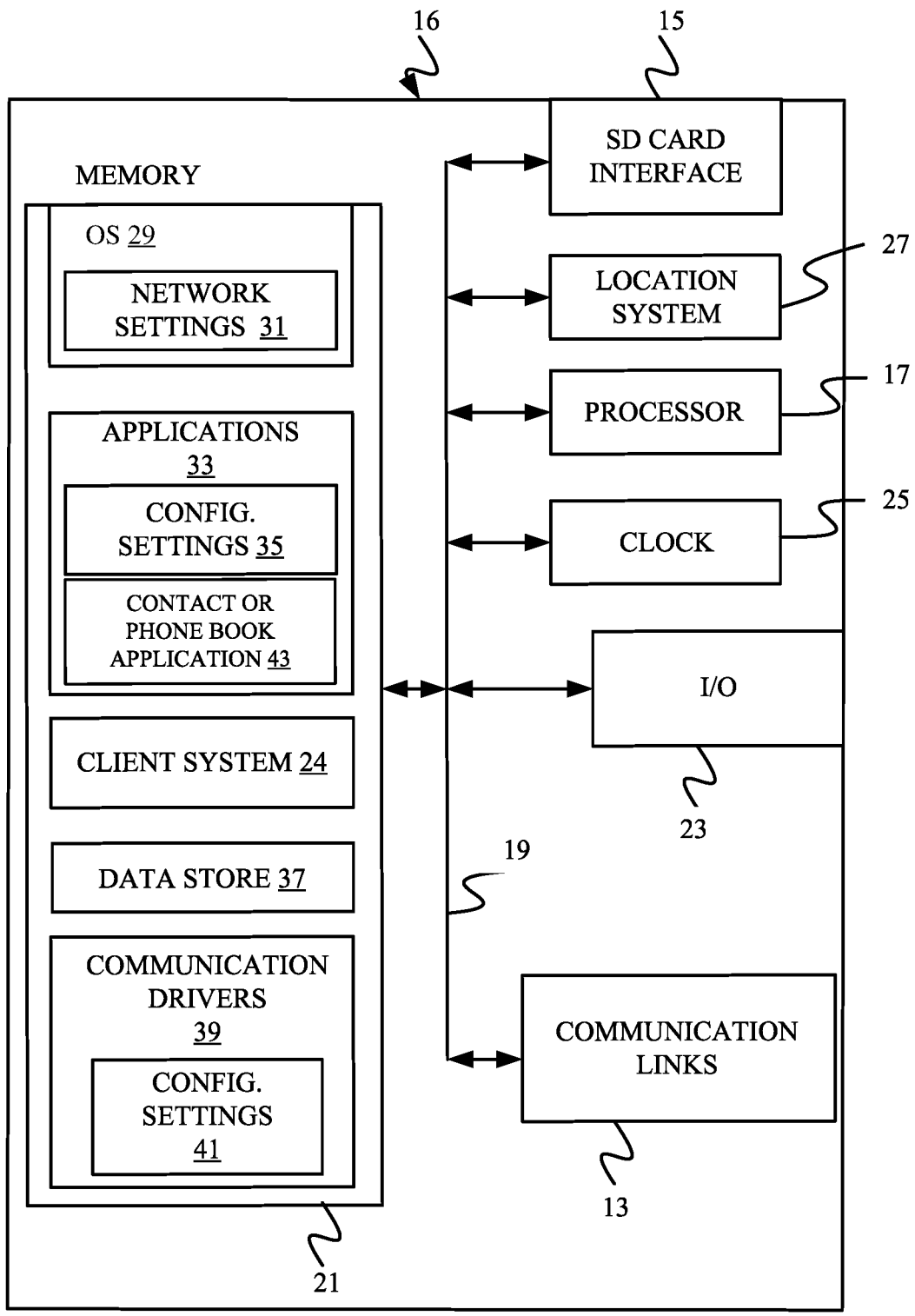
FIG. 20 provides a general block diagram of the components of a mobile device that can run some or all components shown in FIGS. 2-13.
Figure 21:
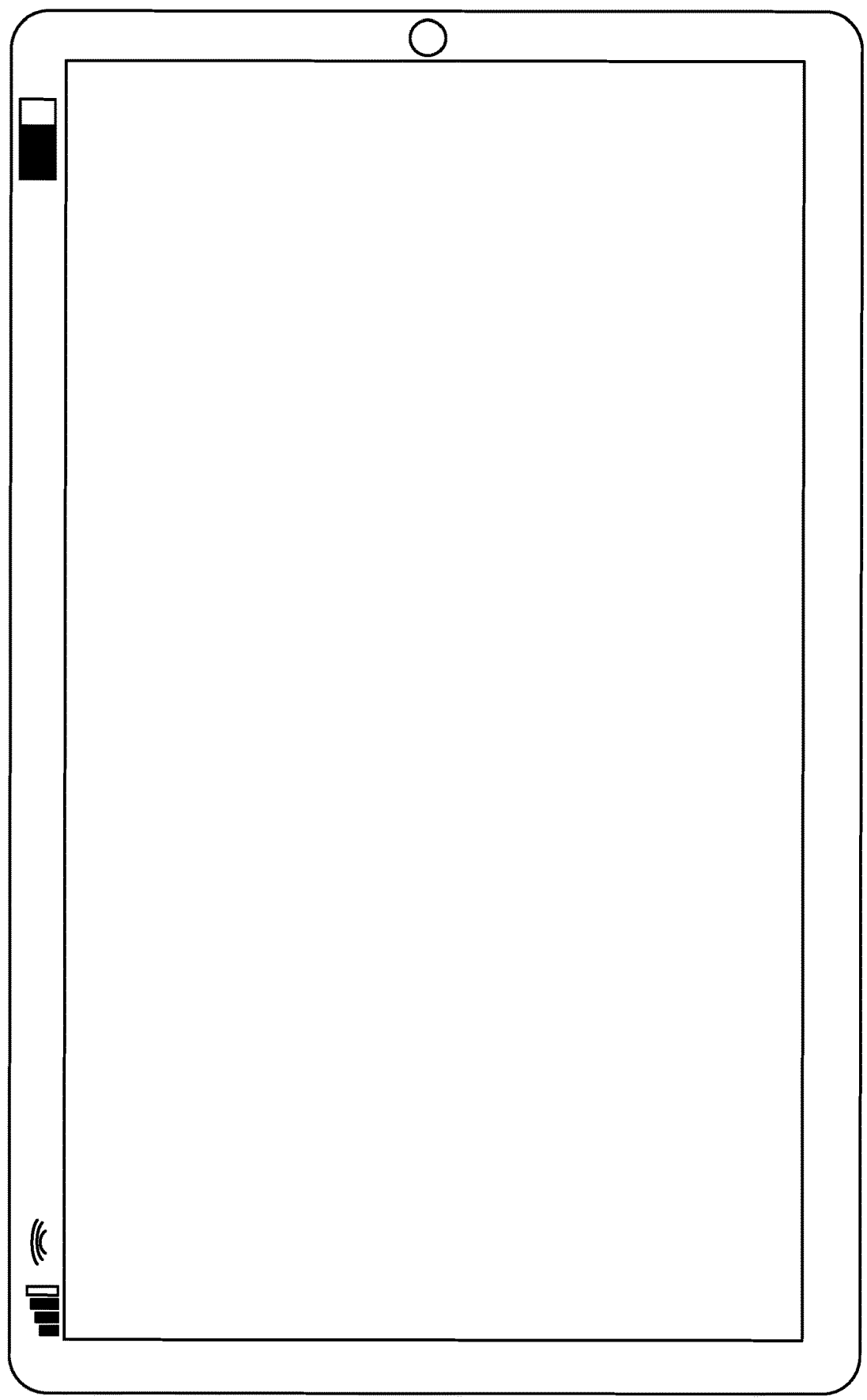
FIGS. 21 and 22 shows embodiments in which the mobile device is a tablet computer or a smartphone, respectively.
Figure 22:
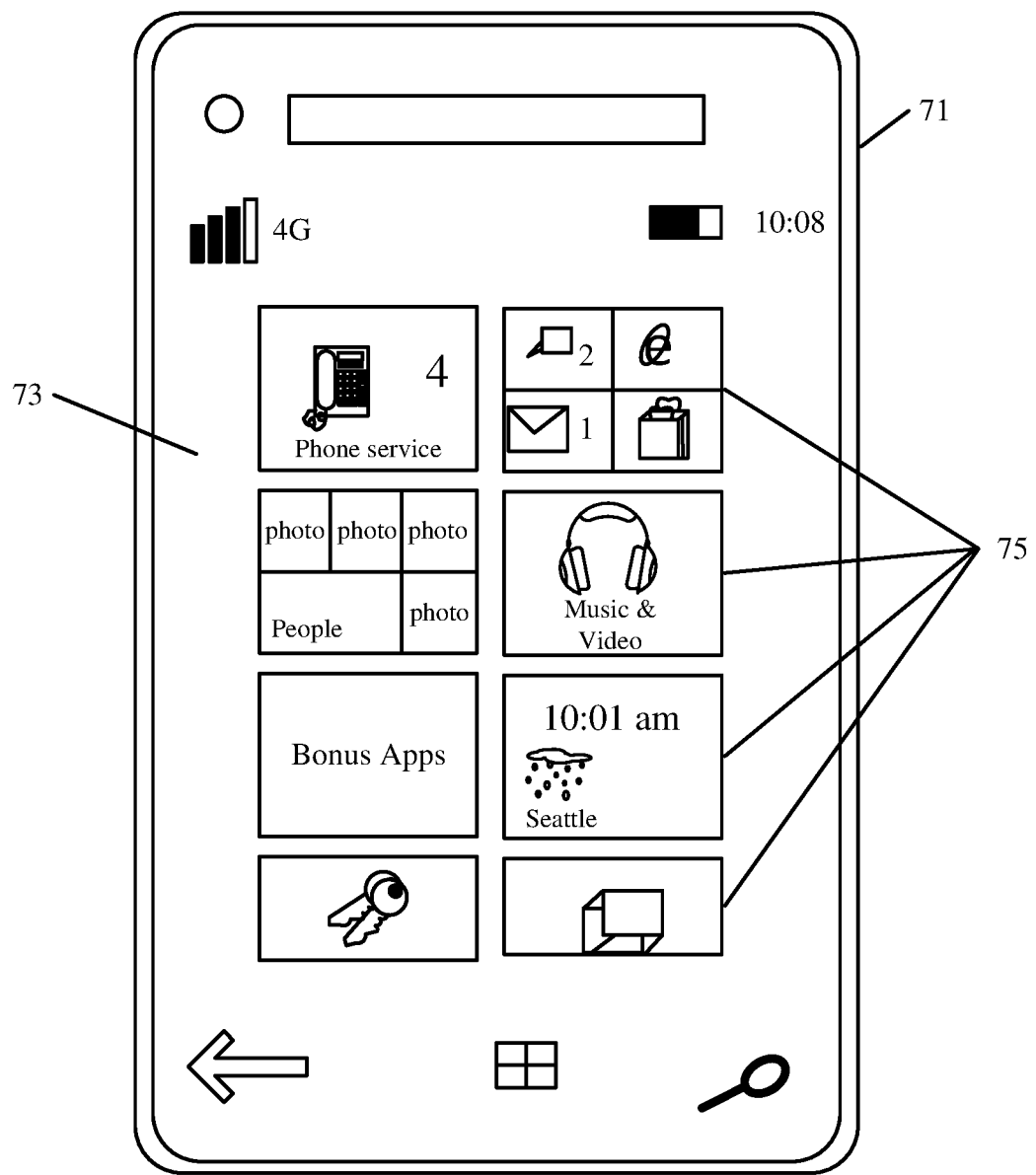

FIG. 20 is a simplified block diagram of one illustrative embodiment of a handheld or mobile computing device that can be used as a user's or client's hand held device 16, in which the present system (or parts of it) can be deployed. FIGS. 21-22 are examples of handheld or mobile devices.

FIG. 20 provides a general block diagram of the components of a client device 16 that can run some components shown in FIGS. 2-13, to interact with the autonomous work machine. In mobile device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33 (such as the autonomy management application), application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 21 shows one embodiment in which device 16 is a tablet computer. In FIG. 21, that tablet computer is shown with user interface display screen, which can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. The tablet computer can also illustratively receive voice inputs as well.

FIG. 22 provides an additional example of devices 16 that can be used, although others can be used as well. In FIG. 22, a smart phone or mobile phone 71 is provided as the device 16. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Figure 23:
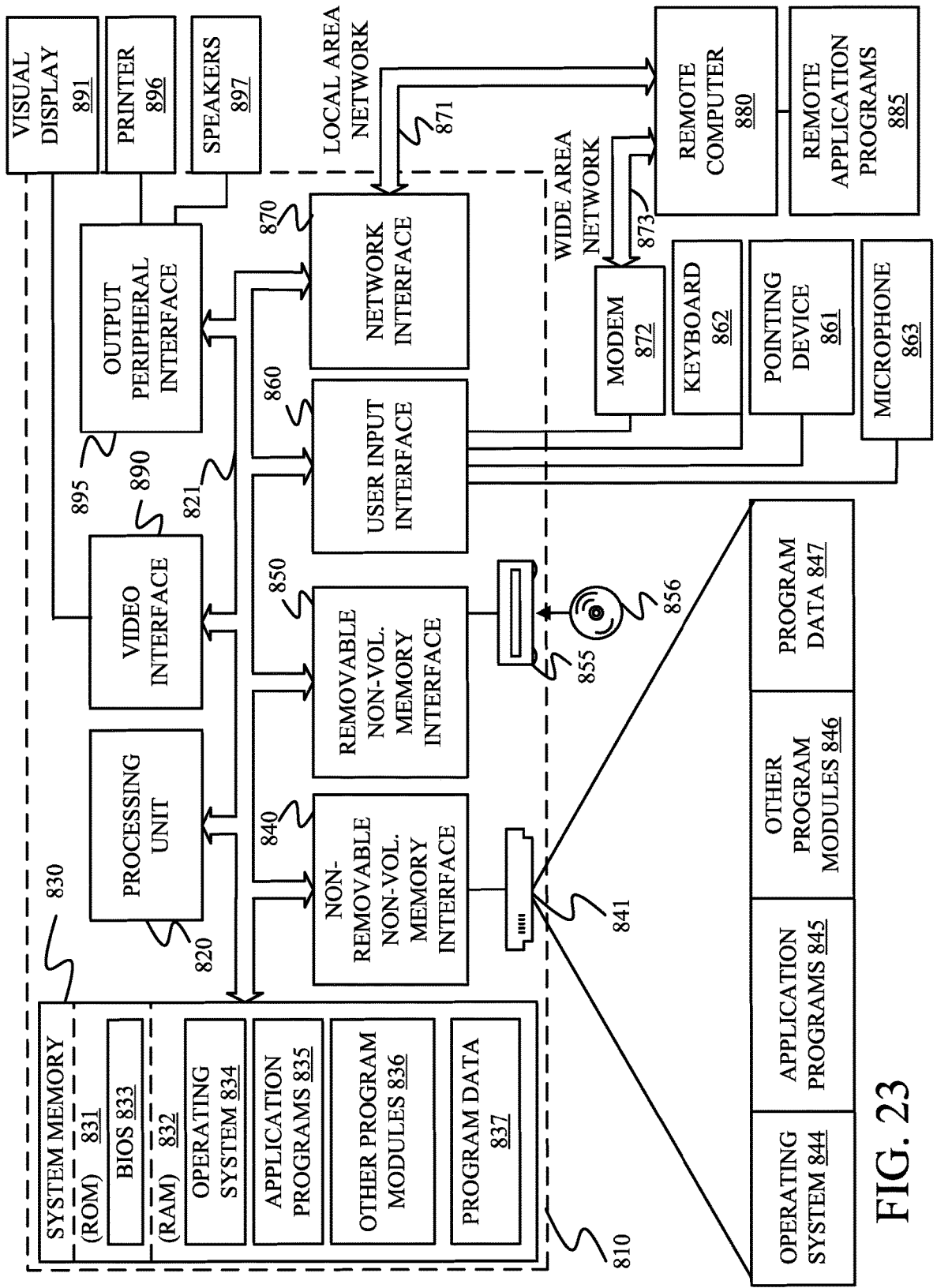
FIG. 23 is a diagrammatic view of one example of a computing environment in which elements of FIG. 1, or parts of it, (for example) can be deployed.

FIG. 23 is one embodiment of a computing environment in which elements of FIG. 1, or parts of it, (for example) can be deployed. With reference to FIG. 23, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 23.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 19 illustrates a hard disk drive 841 that reads from or writes to non-removable, nonvolatile magnetic media, a magnetic disk drive 851, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 23, provide storage of computer readable instructions, data structures, program modules and other data for the computer 810. In FIG. 23, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 23 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device comprising:
   a processor;
   memory, coupled to the processor, the memory containing instructions that when executed cause the processor to provide an autonomy management application, wherein the autonomy management application includes an autonomy approval function;
   the autonomy approval function providing a user interface configured to display an autonomy job to a user, the display including a map of a selected field and pathing information relative to the selected field, the user interface being configured to receive user acceptance of the autonomy job;
   the autonomy approval function being configured to instruct the user to move within a pre-determined distance from an autonomous work machine that will execute the autonomy job, and provide a machine-verified indication of user proximity within the pre-determined distance;
   the autonomy approval function providing a display indicative of at least one system check performed by the autonomous work machine, wherein the at least one system check includes a subsystem check of an implement coupled to the autonomous work machine;
   the autonomy approval function including a begin mission user interface element displayable based on verification that the user has moved within the pre-determined distance of the autonomous work machine, wherein the begin mission user interface element is configured to receive user input and wherein the processor is configured to selectively cause the autonomy approval function to display a depiction of the autonomous work machine with a visual indication that the autonomous work machine is initiating motion and wherein the autonomy approval function is configured to initiate motion based on the user input to the begin mission user interface element.

2. The mobile device of claim 1, wherein user proximity within the pre-determined distance is detected by comparing GPS coordinates of the autonomous work machine with GPS coordinates of the mobile device.

3. The mobile device of claim 1, wherein the display provides an indication of a perception system check, wherein the perception system check includes a check of a plurality of cameras coupled to the autonomous work machine.

4. The mobile device of claim 1, wherein the display provides an indication of a positioning system check.

5. The mobile device of claim 1, wherein the display provides an indication of a tractor subsystem check.

6. The mobile device of claim 1, wherein the display provides a countdown timer indicating time until the autonomous work machine will begin motion.

7. The mobile device of claim 1, wherein the display provides a flashing indication relative to lights of the autonomous work machine and also causes corresponding lights on the autonomous work machine to flash.

8. The mobile device of claim 7, wherein the autonomy approval function provides a halt user interface element that is configured to receive user input and wherein the processor is configured to selectively halt motion of the autonomous work machine based on user input to the halt user interface element.

9. The mobile device of claim 1, wherein the autonomy management application provides an edit user interface element that is configured to receive user input and wherein the processor is configured to selectively allow the user to edit the autonomy job based on user input to the edit user interface element.

10. The mobile device of claim 1, wherein the begin mission user interface element requires the user to slide the user interface element.

11. A computer-implemented method of providing autonomy approval for an autonomous work machine, the method comprising:
displaying a selected field and pathing of an autonomy job for an autonomous work machine to a user;
receiving user approval of the autonomy job;
instructing the user to ensure that the user is within a pre-determined distance from the autonomous work machine;
detecting user proximity within the pre-determined distance from the autonomous work machine;
executing a system perception check that checks at least a plurality of cameras positioned on the autonomous work machine based on user approval of the autonomy job;
executing an implement subsystem check based on user approval of the autonomy job;
providing a begin mission user interface element based on detecting the user proximity within the pre-determined distance;
selectively engaging motion of the autonomous work machine based on user input to the begin mission user interface element; and
generating an alert that motion startup is occurring, wherein the alert includes a depiction of the autonomous work machine with a visual indication that the autonomous work machine is initiating motion.

12. The computer-implemented method of claim 11, wherein detecting user proximity includes detecting electromagnetic radiation relative to at least one of the user and the autonomous work machine.

13. The computer-implemented method of claim 11, wherein the begin mission user interface element is provided on a mobile device.

14. The computer-implemented method of claim 11, and further comprising providing a halt user interface element that is configured to receive user input and wherein the processor is configured to selectively halt the autonomous work machine to halt motion based on user input to the halt user interface element.

15. The computer-implemented method of claim 11, and further comprising executing a perimeter check around the autonomous work machine.

16. The computer-implemented method of claim 15, and further comprising providing an indication of progress relative to the perimeter check.

17. The computer-implemented method of claim 16, wherein the indication is provided on a mobile device.

18. The computer-implemented method of claim 16, wherein the indication of progress shows an individual perception system sensor that is being tested, among a plurality of perception system sensors.

* * * * *